United States Patent [19]

Warwicker et al.

[11] 4,090,010
[45] May 16, 1978

[54] WATER VAPOR PERMEABLE MICROPOROUS SHEET MATERIALS AND THEIR METHOD OF MANUFACTURE

[75] Inventors: Eric Albert Warwicker; David Price, both of Norfolk, England

[73] Assignee: Porvair Limited, Norfolk, England

[21] Appl. No.: 369,112

[22] Filed: Jun. 11, 1973

Related U.S. Application Data

[63] Continuation-in-part of Ser. No. 208,042, Dec. 9, 1971, abandoned.

[30] Foreign Application Priority Data

Dec. 11, 1970 United Kingdom .............. 59121/70

[51] Int. Cl.² ........................ B29D 27/04; B32B 3/26
[52] U.S. Cl. ............................. 428/304; 260/2.5 AY;
264/41; 264/45.1; 264/45.8; 264/49; 428/306;
428/904
[58] Field of Search ............. 117/72, 76 T, 63, 135.5,
117/161 KP; 264/41, 49, 45.1, 45.8; 428/304,
306, 904; 260/2.5 AY

[56] References Cited

U.S. PATENT DOCUMENTS

| | | | |
|---|---|---|---|
| 2,700,694 | 1/1955 | Furnald | 260/2.5 M |
| 2,783,894 | 3/1957 | Lowell et al. | 260/2.5 M |
| 3,100,721 | 8/1963 | Holden | 264/41 X |
| 3,190,766 | 6/1965 | Yuan | 264/41 X |
| 3,222,208 | 12/1965 | Bertollo | 117/63 |
| 3,450,650 | 9/1969 | Murata | 260/2.5 M |
| 3,496,000 | 2/1970 | Hull et al. | 117/135.5 X |
| 3,524,753 | 8/1970 | Sharp | 117/63 X |
| 3,536,796 | 10/1970 | Rock | 260/2.5 M |
| 3,687,715 | 8/1972 | Kigane et al. | 117/76 R |
| 3,729,538 | 4/1973 | Cunningham et al. | 264/49 |
| 3,791,997 | 2/1974 | Hathorn et al. | 264/49 X |

FOREIGN PATENT DOCUMENTS

| | | | |
|---|---|---|---|
| 1,217,341 | 12/1970 | United Kingdom | 260/2.5 M |
| 1,217,342 | 12/1970 | United Kingdom | 260/2.5 M |

OTHER PUBLICATIONS

Bernhardt, Ernest C., Edt. "Processing of Thermoplastic Materials," New York, Reinhold, ©1959, pp.15–22.
McKelvey, James M. "Polymer Processing," New York, John Wiley and Sons, ©1962, pp. 31–36.
Dunn; Jerome L. and Charles Kahn, "Flow Control of Plastisols," in 1970–1971 Modern Plastics Encyclopedia, pp. 372, 376, 378, 380.

*Primary Examiner*—Philip Anderson
*Attorney, Agent, or Firm*—Abner Sheffer

[57] ABSTRACT

There is disclosed a process in which both non-solvent e.g., water and filler particles e.g., microscopic sodium chloride are added in certain proportions to a polymer solution e.g., polyurethane in dimethylformamide preferably at elevated temperature and coagulated by immersion in non-solvent. This results in a more rapid coagulation time than when solvent or filler alone are used and also results in a microporous product of improved properties and novel pore structure.

19 Claims, 20 Drawing Figures

200 MICRONS

200 MICRONS

200 MICRONS

200 MICRONS

50 MICRONS

200 MICRONS

200 MICRONS

200 MICRONS

50 MICRONS

200 MICRONS

50 MICRONS

50 MICRONS

50 MICRONS

50 MICRONS

50 MICRONS

50 MICRONS

WATER VAPOR PERMEABLE MICROPOROUS SHEET MATERIALS AND THEIR METHOD OF MANUFACTURE

CROSS-REFERENCE TO RELATED APPLICATION

This application is a continuation-in-part of Application Ser. No. 208,042, filed Dec. 9, 1971 now abandoned, whose disclosure is incorporated herein.

The present invention relates to novel microporous polymer sheet materials and to novel processes for making them.

The present invention finds a particular application in the production of relatively thick polymer layers free from preformed fibrous sheet reinforcement for example from 0.5 millimeters up to as thick as 5 millimeters or more and especially to the production of layers having a thickness making them suitable for use as shoe upper materials for example 0.8 millimeters to 1.5 millimeters preferably 0.8 to 1.1 millimeters for women's weight shoes and 1.1 to 2.5 millimeters preferably 1.5 to 1.8 millimeters for men's weight shoes.

It is known from British Patent Specification No. 1,217,341 to make such materials by coagulating a solution of polyurethane dissolved in dimethylformamide containing dispersed microscopic sodium chloride particles. The preferred solution contains 30% to 35% w/w of polyurethane and 1.5 to 2.0 parts w/w of sodium chloride per part of polyurethane. The coagulation is carried out by immersing the mixture in liquid water.

This produces a good product but whilst it is excellent for use in producing shoe uppers for many types of shoes it is somewhat stiff for some uses.

It is an object of the present invention to produce a more flexible form of this product and a process for making it.

Also, if the time taken to achieve the coagulation could be reduced this would make the process have a higher yield.

It is another object of the present invention to produce an improved process for coagulating polymer solutions to microporous sheet materials.

It is also known from British patent specification No. 1,220,218, to make materials of this type which have two superimposed integrally formed layers one, the substrate, preferably being made from the formulations disclosed in British Pat. No. 1,217,341, and the other, the topcoat, preferably being made from similar formulations having higher salt concentrations, e.g., 3 to 1 and above. The substrate layer is spread on a porous support and the topcoat layer spread on top of the substrate layer. The two layers are then coagulated simultaneously by being immersed in water. This material is excellent for use as shoe upper material after suitable surface finishing operations such as spraying with a solvent and heating with an airstream as disclosed in British Pat. No. 1,190,551.

However, it has a tendency for the surface to exhibit very slight undulations which can become visible when light strikes the surface at an angle.

If this tendency could be reduced it would improve the product, and it is another object of the present invention to provide such an improved product and a process for making it. It is stated in British Pat. No. 1,108,365 that one can form microporous polymer coatings on porous substrates by using the process of that patent. This process consists of impregnation of porous mats with polymer solutions, squeezing to remove excess polymer solution and coagulation. The polymer solution contains less than 20% polymer and 3.8% to 5% of non-solvent, e.g., water. The coagulation is achieved by cooling the impregnated mat, e.g., from 50° C to 5° C or below. This is stated in the examples to very substantially reduce the time required for coagulation. It is also stated to produce a microporous sheet.

This may be the case when a porous mat is impregnated but we have found that when this type of procedure is attempted with a thick continuous polymer layer a product having large macro-pores extending through the thickness of the sheet and visible to the unaided eye is produced. In addition we have found that when the temperature of coagulation is reduced from 30° C to 19° C the coagulation time increases by about 25% (the system having been cooled from 50° C) contrary to the teachings of British Pat. No. 1,108,365.

We have found surprisingly that when both water and microscopic sodium chloride particles are added in certain proportions to a polyurethane solution in dimethylformamide at elevated temperature, e.g., 50° C and coagulated by immersion in water either at 50° C or at lower temperatures not only is the coagulation time actually reduced but also an excellent microporous product of improved properties and novel pore structure is produced.

Moreover, when these formulations are used in the two layer process of British Pat. No. 1,220,218, a product having improved surface smoothness is produced.

When the non-solvent is left out the coagulation is very much slower for example it takes nearly twice as long and moreover the product has a less smooth top surface than when both filler and non-solvent are used.

When the removable filler is left out the water vapour permeability drops to as little as ⅓ or even ¼ of the value when it is present and in addition the product has a marked tendency to have large macrovoids i.e., holes visible to the naked eye aligned through the thickness of the material which considerably reduces the strength of the material and makes it much stiffer.

Moreover, the addition of these proportions of both non-solvent and salt to the polyurethane solution surprisingly makes the system such that its viscosity decreases with increasing shear rate) whilst the addition of the same amounts of non solvent and salt separately do not impart this property. This property is a substantial advantage in that it enables the system to be easily pumped and spread as thick layers.

DETAILED DESCRIPTION

Thus according to the present invention a process for making a microporous sheet material which involves coagulation of a layer of polyurethane composition extended with liquid vehicle by means of a liquid non-solvent miscible with the liquid vehicle is characterised by the presence in the layer of polymer extended with liquid vehicle prior to coagulation of dispersed microscopic removable filler particles and liquid non-solvent for the polymer, and by the content of polymer in the layer being at least 20% w/w, the content of non-solvent and filler particles being such as to impart to the polyurethane composition the property of decreased viscosity with increased shear rate, the amount of non-solvent preferably being in excess of 1.6% w/w based on polymer, solvent, non-solvent and removable filler.

Thus, the battery supply of case 30 can be saved until the operator is unable to use a suitable auxiliary power source.

In still another configuration, a power converter 52 having special adapter plug 53 might be used to convert AC power into 112-volt DC power. This source is then used to drive the amplifier circuitry and speaker 32 whose plug end 38 is mated with the male prongs of adapter 53. Thus, the public address sytem may be used in auditoriums or other buildings or areas which have access to AC power without running down the batteries contained in case 30.

Also shown in FIG. 1 is an auxiliary sound source 40. This sound source can be a radio, a microphone or other source of electronic sound impulses. Signals from source 40 are fed into the amplifier circuitry by inserting plug 44 into input jack 18 and moving switch 16 into its second operating position. The amplifier cirlcuitry of the present invention then amplifies these signals and outputs them through output speaker 32. An auxiliary source may be used with power to the amplifier circuit being supplied by the batteries in case 30 when the director is away from other available sources of power; with an alternate source of power 50 when the operator is inside a vehicle; or with power converter 52 when the director has AC power available.

FIG. 2 shows, in schematic representation, the electronic circuitry contained within the housing 10. The circuit includes switch 16, auxiliary input jack 18, an input coupling capacitor 60, an input resistor 62, a preamplifier including a pair of transistors 64 and 66 arranged in Darlington configuration, a feedback resistor 68, a set of biasing resistors 70, 72, and 74, an adjustable output load resistor 76, an input coupling capacitor 78, a power amplifier 80, a damping capacitor 82, an isolating capacitor 84, an output coupling capacitor 86, a diode 88 and a DC blocking capacitor 90.

In a preferred embodiment the following components having the following values have been found to give satisfactory performance.

| | |
|---|---|
| capacitor 60 | .05 micro farad |
| resistor 62 | 68K ohms |
| resistor 68 | 1.8M ohms |
| resistor 70 | 820K ohms |
| resistor 72 | 270 ohms |
| resistor 74 | 470K ohms |
| resistor 76 | 0-1M ohms |
| capacitor 78 | .05 micro farad |
| capacitor 82 | 470 pico farad |
| capacitor 84 | 10 micro farad |
| capacitor 86 | 50 micro farad |
| capacitor 90 | 10 micro farad |

Two integrated circuits are also used; transistor 64 and 66 are included in a 2N5306; and amplifier 80 is a National Semiconductor LM380.

Input signals received from microphone 12 are fed through blocking capacitor 60 and isolation resistor 62 to transistor 64. Transistor 64 is combined with transistor 66 in a Darlington configuration 67 to provide a circuit with a high input impedance suitable for matching with microphone 12. Resistors 70, 72, and 74 provide the appropriate voltage bias to transistors 64 and 66 for proper operation of circuit 67.

This configuration provides many advantages which could only be achieved previously by using field-effect transistors (FET). The circuit 67, as used here, provides pre-amplification of the signal voltage as well as impedance matching, i.e., high input impedance and voltage amplification. Additionally, the circuit provides a higher amplification ratio than is normally available using FETS.

Overall amplification is controlled by adjusting the output voltage level of circuit 67. The output of circuit 67 is developed across resistor 76 which is a potentiometer adjustable by knob 14 on the outside of housing 10 (See FIG. 1). The amplified signal from circuit 67 is applied through blocking capacitor 78 to the integrated circuit power amplifier 80 which amplifies the signal and outputs it through capacitor 86 to a loudspeaker (not shown). Capacitor 82 serves to prevent amplifier 80 from developing spurious oscillations and capacitor 84 decouples amplifier 80 from the power supply. Thus, by adjusting knob 14 the overall amplification ratio may be adjusted which in turn controls the level of sound developed by the speaker(s).

In this embodiment, an amplification ratio of approximately twenty-five may be achieved. Higher ratios are possible if the degenerative feedback through resistor 68 is reduced. However, feedback enhances signal stability and minimizes distortion.

Safeguards against failure are built into the system. Diode 88 provides protection to the system in the event that a wrong polarity DC voltage is inadvertently applied to the amplifier circuit. Capacitor 90 allows DC isolation of the system and provides a signal ground which enables the invention to be used with any number of vehicles having either negative or positive ground.

Turning now to FIG. 3 of the drawing, a sectional view is shown of case 30 along the line 3—3. As illustrated, inside the housing of case 30 are four sets of pairs of 1 ½-volt dry cell batteries 92, a speaker 32, and a set of prongs 94. Batteries 92 are connected in series to provide a voltage supply equal to eight times 1 ½-volts or 12-volts. This voltage supply is output through two of the prongs 94. Speaker 32 is connected to two of the other prongs 94. One prong connected to speaker 32 and a prong connected to the battery supply are connected together to provide a ground for speaker 32.

In one configuration, cable 36 is connected to prongs 94 at one end and to prongs 20 at the other end. In this configuration, the 12-volt battery supply 92 contained inside case 30 energizes the amplifier circuitry and drives speaker 32. Signals received from built-in microphone 12 are thus amplified and broadcast through speaker 32 using power from batteries 92.

In another configuration, an auxiliary source 40, which may be a remote microphone, is attached via cable 42, plug 44 and jack 18. As previously described, the auxiliary source can then be selected using switch 16. In this configuration, power is still supplied to the circuit by the batteries 92. Signals received from the auxiliary microphone are amplified by the amplifier circuitry and again broadcast through speaker 32.

In still another configuration, a cable is connected to the 12-volt power supply and the speakers of a vehicle at one end and configured to connect with the appropriate prongs 20 at the other. Thus, either the built-in microphone 12 or an auxiliary source 40 can be used with a vehicle to broadcast information through the vehicle's speakers.

Even though several embodiments of the invention have been set forth by way of example, it is anticipated that numerous modifications and alterations will become apparent to those skilled in the art after having read the above disclosures. It is therefore intended that the following claims be interpreted to cover all such The invention also extends to these thixotropic compositions per se.

The invention also extends to a process for making microporous sheet material of improved surface smoothness comprising at least two superposed integrally united microporous layers wherein one layer, the substrate layer, is preferably thicker than the other, the topcoat layer, and the two layers are formed from polymer systems comprising elastomeric thermoplastic polymer, solvent therefor and preferably microscopic removable filler particles by spreading a substrate layer on a preferably porous support and a topcoat layer on the substrate layer and then coagulating the two layers simultaneously to an integral self-supporting microporous sheet by treatment with a non-solvent for the polymer miscible with the solvent characterised in that the formulation for the substrate layer comprises at least 20% w/w of polyurethane based on solvent and polymer, microscopic removable filler particles and non-solvent for, the polyurethane, the amount of non-solvent and removable filler particles being such as to render the formulation thixotropic.

The substrate formulation in preferred embodiments of this form of the invention is the same as described above for preferred embodiments of the single layer form of the invention.

The same considerations concerning solvent and removable filler apply for the topcoat formulation and it could also contain non-solvent. However satisfactory topcoats having more open less dense though still microporous structures can be obtained using polymer concentrations of 20% to 40% w/w based on polymer and filler to polymer ratios of 2.5:1 to 3:1 to 6:1. Further details of such formulations and suitable polymers are given in published British Patent Specification No. 1,122,804.

Macroporous topcoat structures convertible to suede leather type appearance by abrading their surfaces can also be produced by the use of polymer systems such as disclosed in published British Patent Specifications Nos. 1,217,342 and 1,002,225.

Other systems of producing microporous coatings such as disclosed in published British Patent Specification Nos. 914,711 and 946,069 involving the production of colloidal polymer dispersions by careful addition of non-solvent can also be used but these are not preferred since the process is difficult to control.

The disclosures of these five publications are incorporated herein by reference.

According to the present invention a novel microporous polyurethane sheet material is characterised by a reticulated matrix of polymer affording a plurality of compact voids intercommunicating by pores, the said matrix being at least 0.5 mm and preferably 1 to 2 mm or more thick and having a total void volume or porosity in excess of 40% preferably 50, 55 or 60% or more e.g., in the range 50% to 65% and at least 50% and preferably at least 60% of the total void volume being provided by pores having diameters in the range 6.4 to 25 microns, and the voids with which the said pores interconnect.

The matrix is substantially free of voids visible to the unaided eye with 20/20 vision in normal daylight. It may be provided with surface finishes either being abraded on one or both surfaces to raise a low nap or may develop integrally into a different structure e.g., through embossing plating or hot pressing to collapse and fuse one or both faces which may thus be rendered impermeable or of lower permeability to water vapour. Alternatively the surface may be partially collapsed to a thin permeable or non permeable skin by deposition of a solvent for the polymer on one or both surfaces of the matrix and then removal of the solvent and fusing of the surface by a hot air blast. Additional permeable or non-permeable coatings or layers of the same or different polymers may also be formed on the matrix either after the matrix has been formed or contemporaneously therewith.

The matrix is preferably composed of elastomeric polyurethane and the invention is illustrated by use of a linear polyester based polyurethane of high elongation at break e.g., hundreds of percent such as at least 300%, 500% or 700%.

The matrix itself also has a high elongation at break e.g., at least 200% and usually 300% to 500% or more.

However, many other polymers can be coagulated to porous form from solvent, and solvent/non-solvent systems and it is believed that such other polymers could be formed into the novel product described herein. Further discussion of the polymer is given below.

The matrix material as mentioned above finds particular use as a man made leather like material.

The novel structure is further characterised when a cut cross section through the thickness is viewed under a microscope, the cut plane showing serpentine convoluted openings which are sections of the voids which are intercommunicating voids. The cut plane is also characterised by repeating more dense regions exhibiting only rather small holes of 1 to 5 microns maximum dimension in the cut plane.

The material is preferably further characterised by the following characteristics when taken individually or in combination, a density in the range 0.45 to 0.55, a flexural rigidity in the range 10 to 60 preferably 20 to 50 milligram cms in both directions when measured in two mutually perpendicular directions in the plane of the sheet, a water vapour permeability of at least 50 preferably 100 to 150 grams/square meter/hour. a mean pore diameter of at least 5.0 and preferably 10 to 15 microns, an initial modulus (25% extension) of 2.5 to 4.5 kg per cm., a tensile strength of at least 9, e.g., 10 to 16 Kg per cm., and a tear strength of at least 5 e.g., 5 to 7 Kg.

The matrix when a cut cross section is viewed is characterised by compact voids typically having maximum dimensions in the plane of the cross section of 10 to 40 microns and shortest transverse dimensions in the plane of ½ their maximum dimension and above. The shapes of the voids are non-spherical and though irregular in outline are generally compact in shape. These voids are typically separated by more compact regions (which can be considered as thicker walls) which contain very much smaller voids typically less than 5 microns across and mostly in the range 0.5 to 3 microns across. There are also still smaller voids. These voids in the compact regions are thought to be the ends of pores intercommunicating the larger voids one with the other. These more dense regions are typically of the order of 5 to 30 e.g., 10 to 20 microns across at their narrowest points between adjacent larger voids. However some of the larger voids will be side by side and connect with one another by much larger openings e.g., 5 to 10 microns across.

The material may be provided with an integral microporous topcoat e.g., 0.1 to 0.5 mm or more thick of the same or different polymer. The matrix is preferably 0.8 to 2.0 mms thick e.g., 0.8 mm thick with a topcoat of 0.1 to 0.2 mms for ladies weight shoe upper material and 1.5 mm thick with a topcoat of 0.2 to 0.4 mms for men's weight shoe upper material.

BRIEF DESCRIPTION OF VIEW OF DRAWINGS

The invention may be put into practice in various ways and a number of specific examples and control examples by way of comparison, will be given to illustrate the invention with reference to the accompanying drawings in which:

FIG. 1 shows the flesh surface of the substrate;

FIG. 2 shows a portion of the substrate above FIG. 1;

FIG. 3 shows the junction between the topcoat and the substrate;

FIG. 4 shows the fused top surface;

Figure 6:
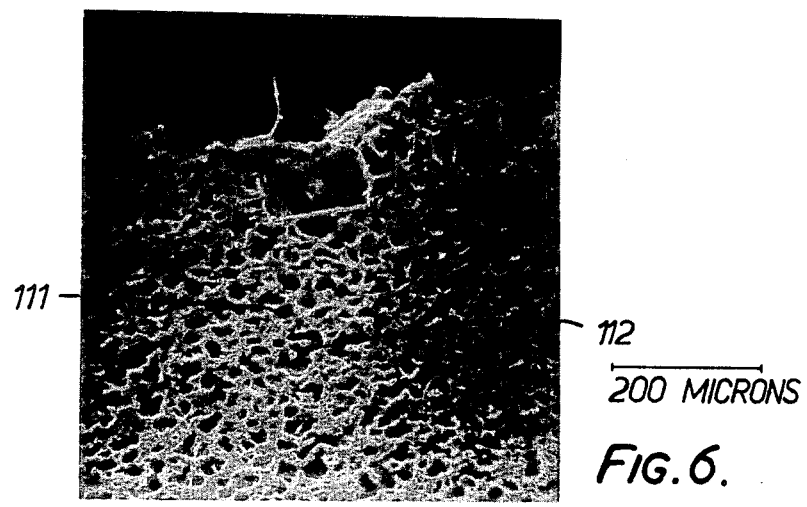
Figure 7:
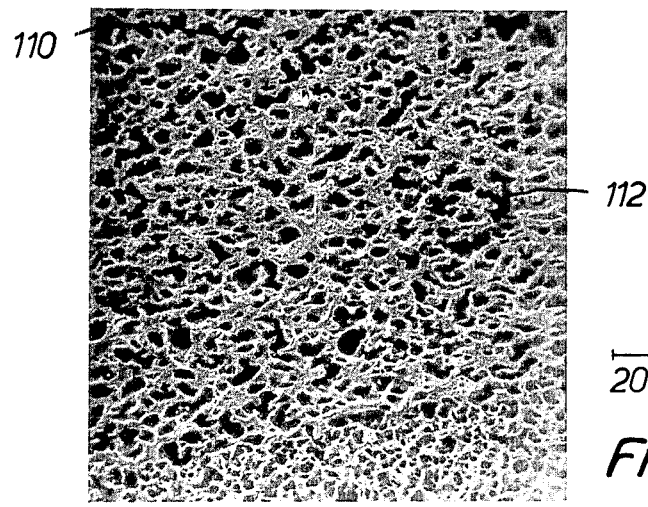
Figure 8:
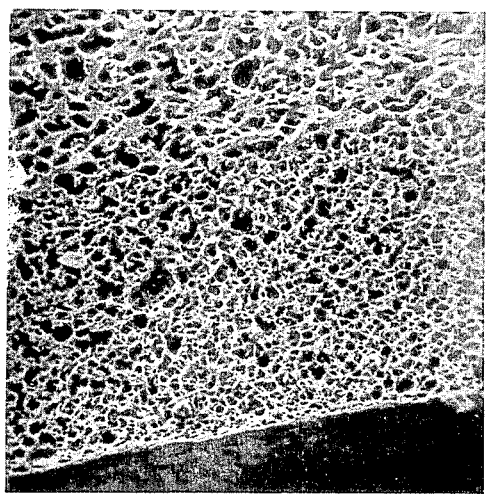
Figure 9:
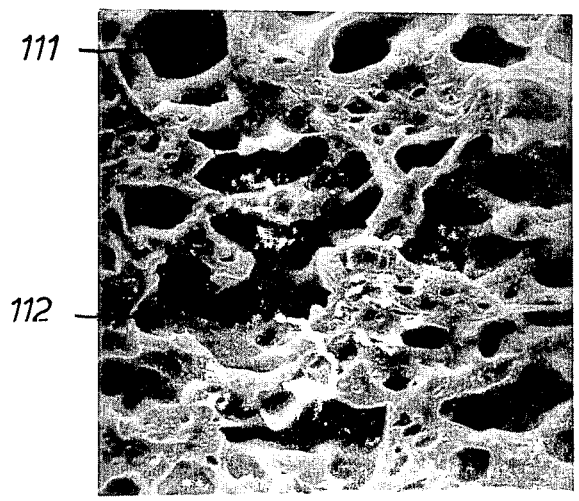
Figure 10:
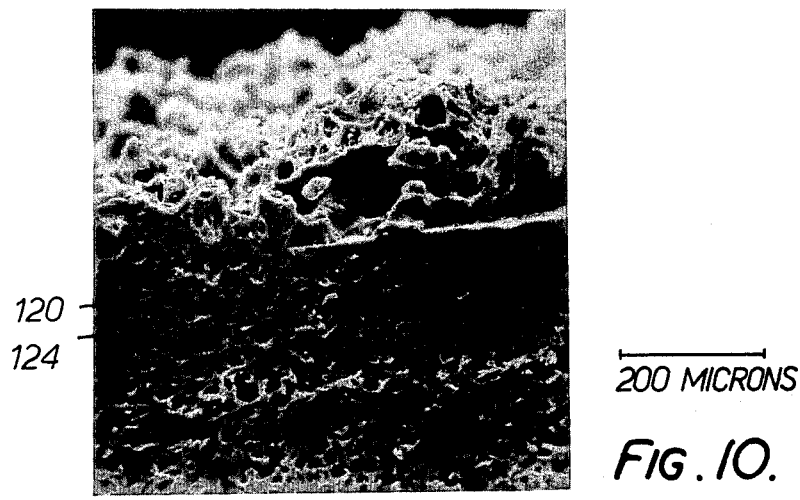
Figure 11:
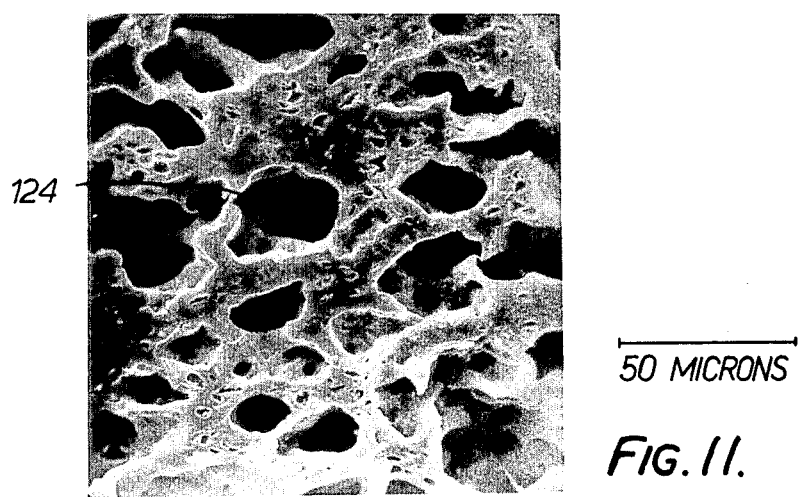
Figure 12:
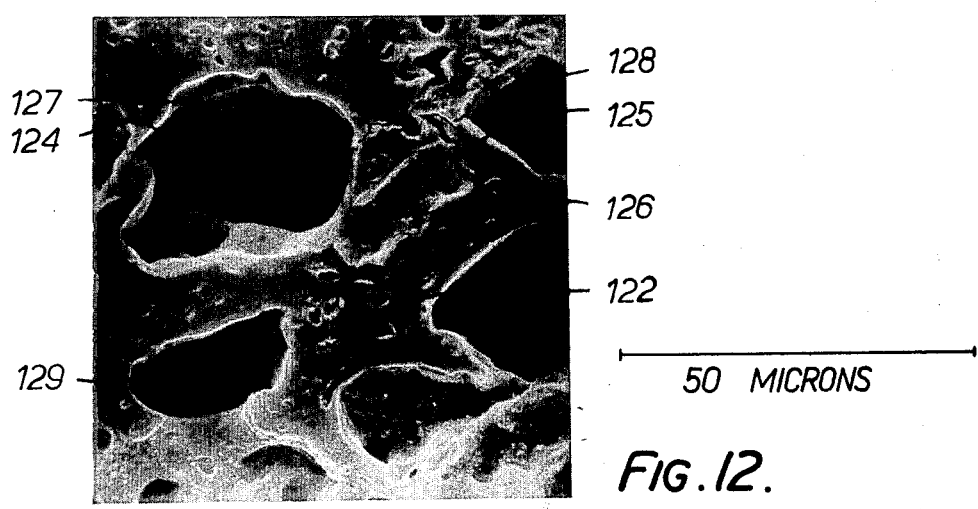
Figure 13:
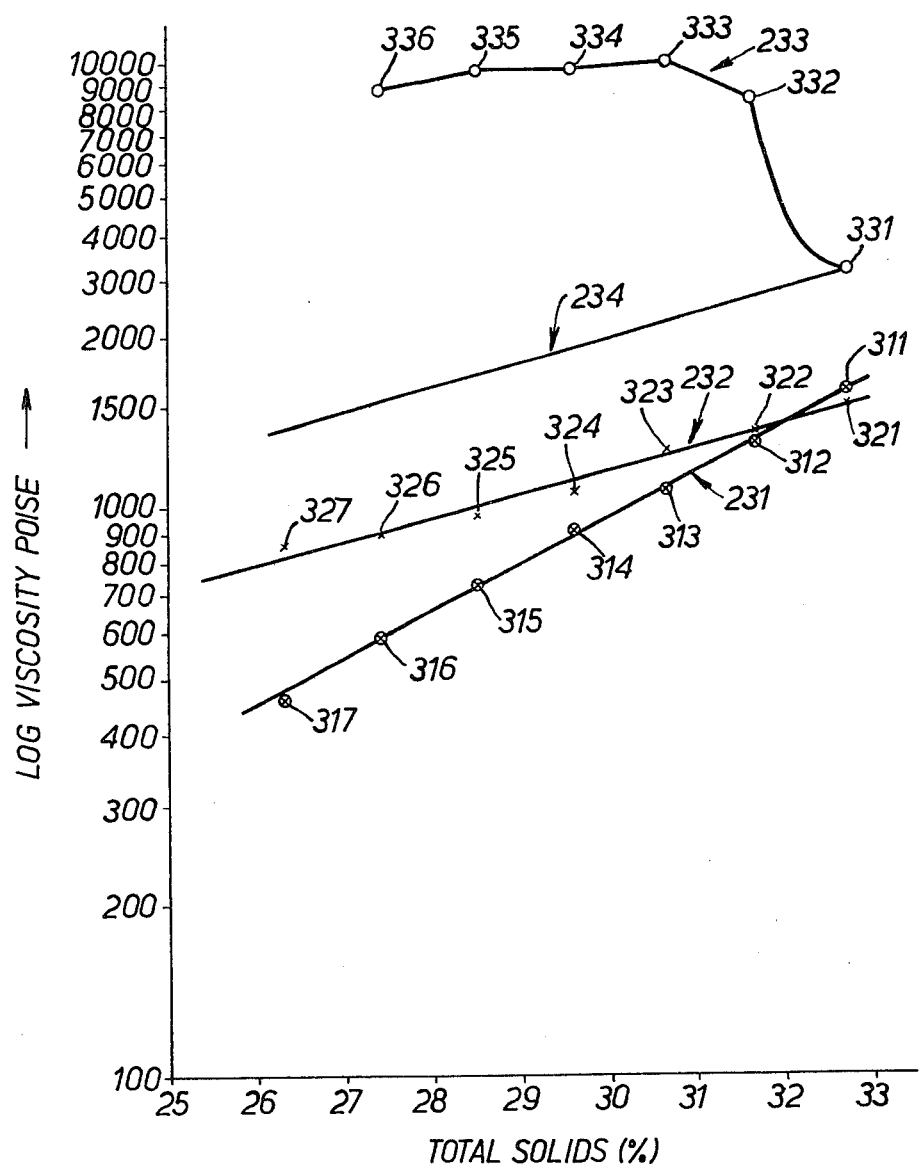
Figure 17:
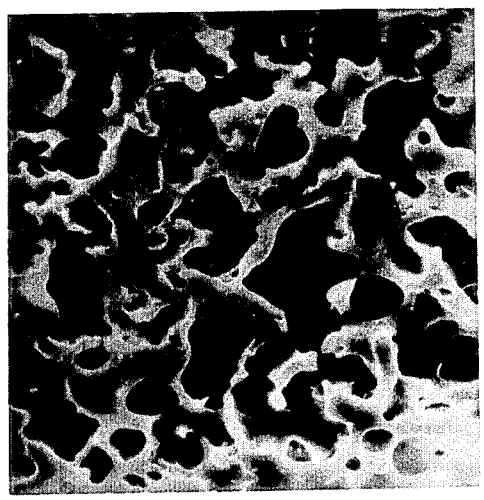
Figure 18:
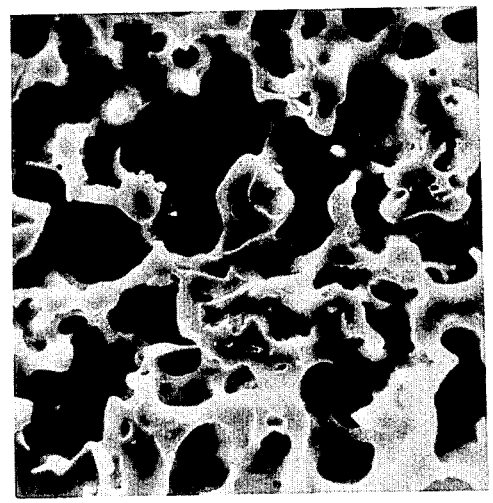
Figure 19:
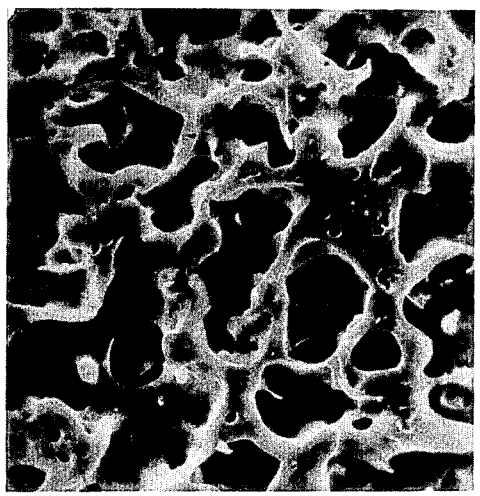
Figure 20:
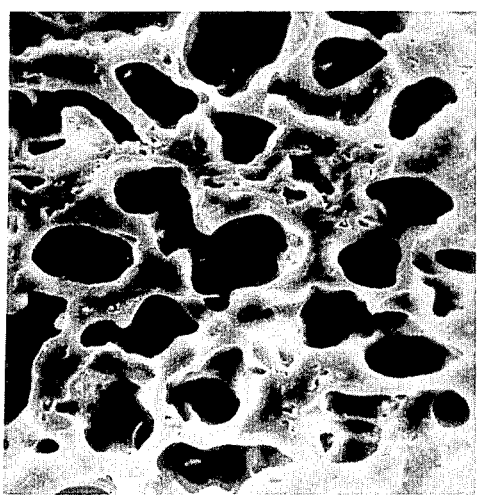
Figure 14:
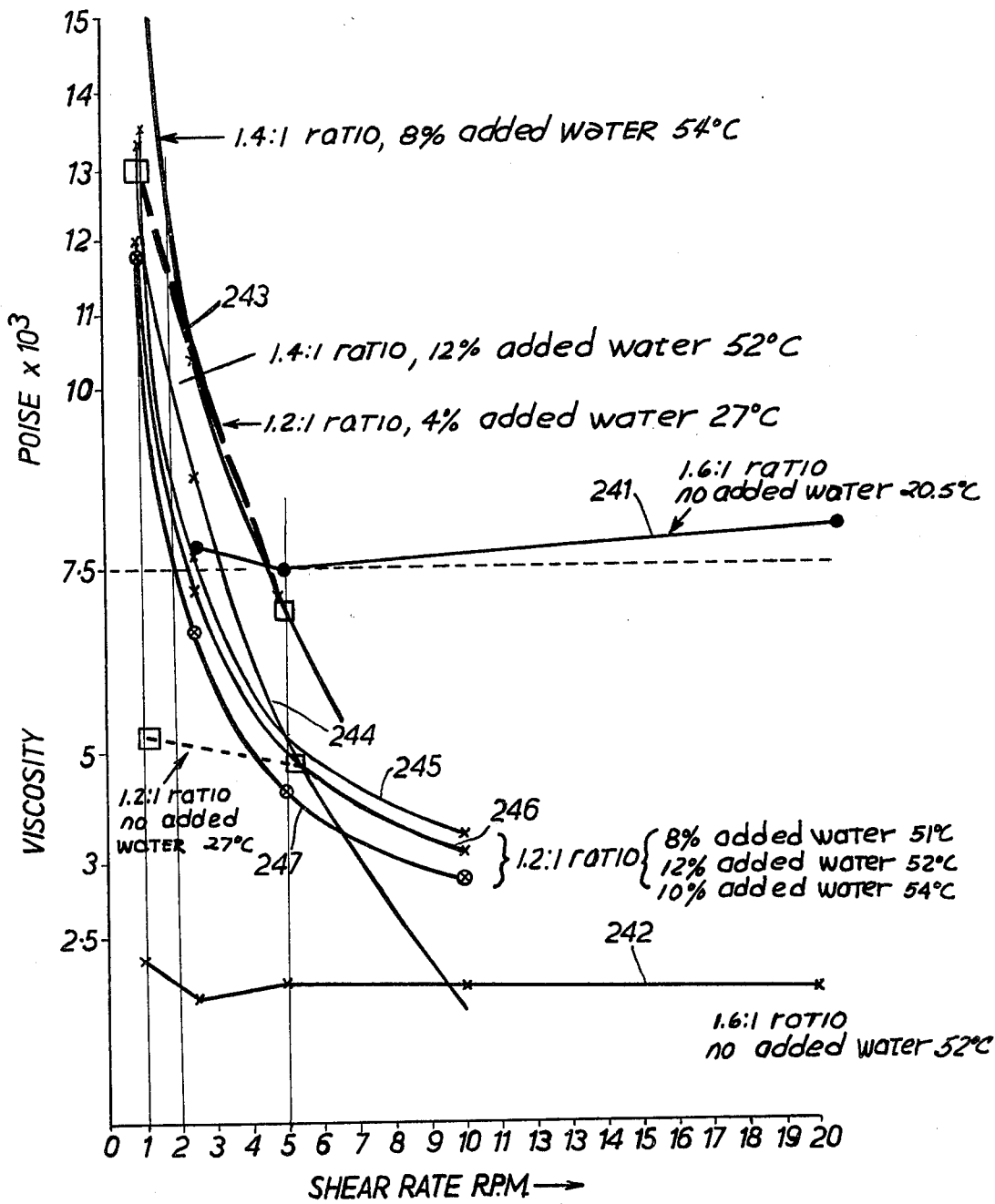
Figure 15:
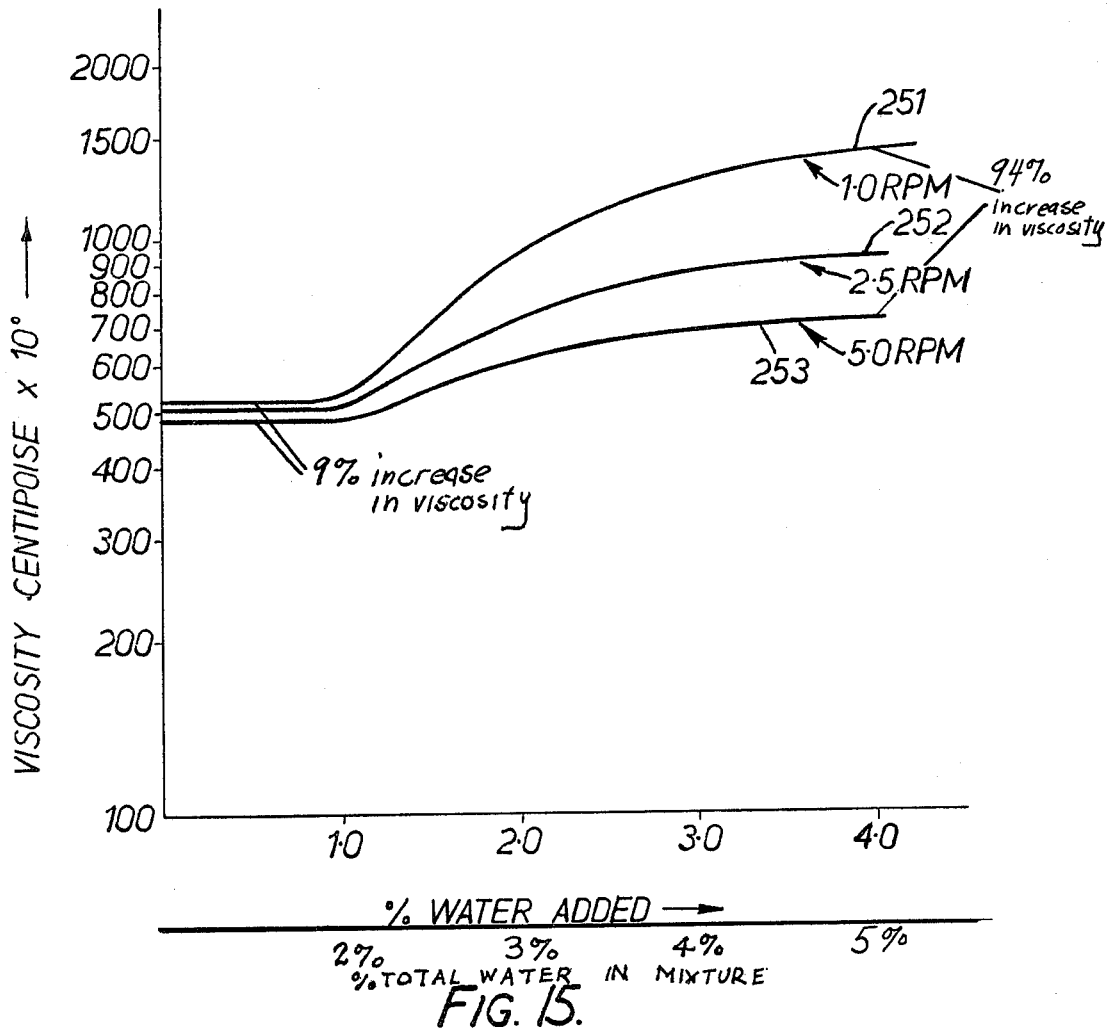
Figure 16:
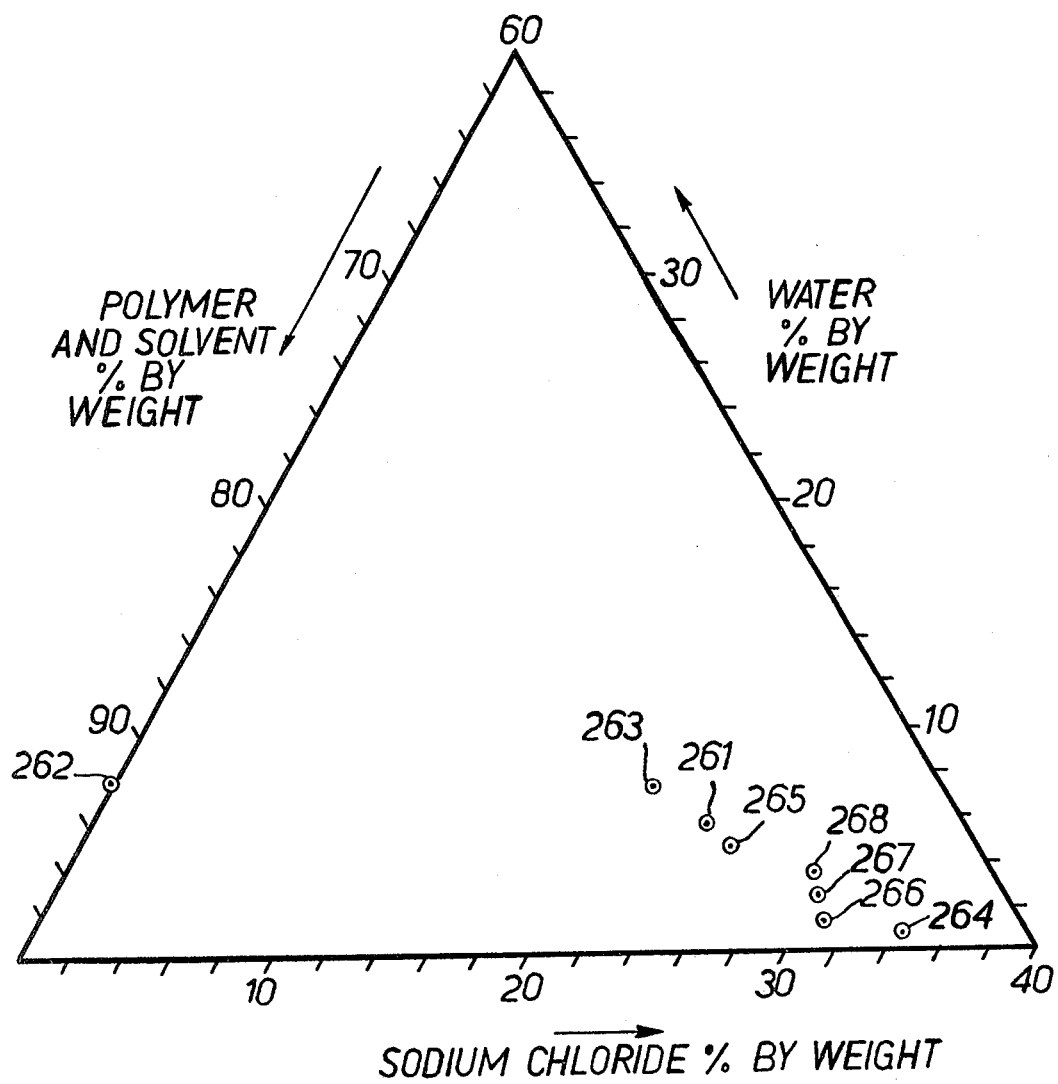

FIGS. 6, 7, 8 and 9 are photomicrographs of the two layer product of Example 11 which is a product in accordance with the invention taken at a slight angle to the 90° cross section at about 120 times magnification and together show the full thickness of the product;

FIG. 6 shows the flesh surface;

FIG. 7 shows the junction between the topcoat and the substrate;

FIG. 8 shows the fused top surface edge and also part of the porous top surface;

FIG. 9 is a view of part of FIG. 6 at about 600 times total magnification;

FIG. 10 is a photomicrograph of a 90° cross section of the two layer product of Example 12 which is in accordance with the invention showing the substrate and flesh surface at about 120 times magnification;

FIG. 11 is a view of part of FIG. 10 at about 600 times total magnification;

FIG. 12 is a view of part of FIG. 11 at about 1190 times total magnification;

FIG. 13 is a graph showing the effect of the addition of salt and water on the viscosity of polyurethane solutions, and FIG. 14 is a graph plotting the variation in viscosity with shear rate for various formulations at various fixed temperatures, using a Brookfield RVT viscometer with a No. 7 spindle;

FIG. 15 is a graph plotting % of water added against viscosity for a given composition at a fixed temperature at three different shear rates, and FIG. 16 is a triangulation graph plotting the percentage by weight of salt water and polymer plus solvent for the examples described in the specification;

FIG. 17 is a photomicrograph of a 90° cross section of the two layer product of Example 14 which is not in accordance with the present invention at about 750 times magnification showing a portion of the substrate about 100 microns (0.1 mm) from the flesh surface;

FIG. 18 is a view similar to FIG. 17 at the same magnification of Example 16 which is in accordance with the present invention and at about the same distance from the flesh surface;

FIG. 19 is a view similar to FIG. 17 at about 760 times magnification showing a portion of the substrate of Example 18 which is in accordance with the present invention about 150 microns (0.15 mm) from the flesh surface;

FIG. 20 is a view similar to FIG. 17 at the same magnification of Example 20 which is in accordance with the present invention and at about the same distance from the flesh surface.

FURTHER DETAILED DESCRIPTION

Figure 1:
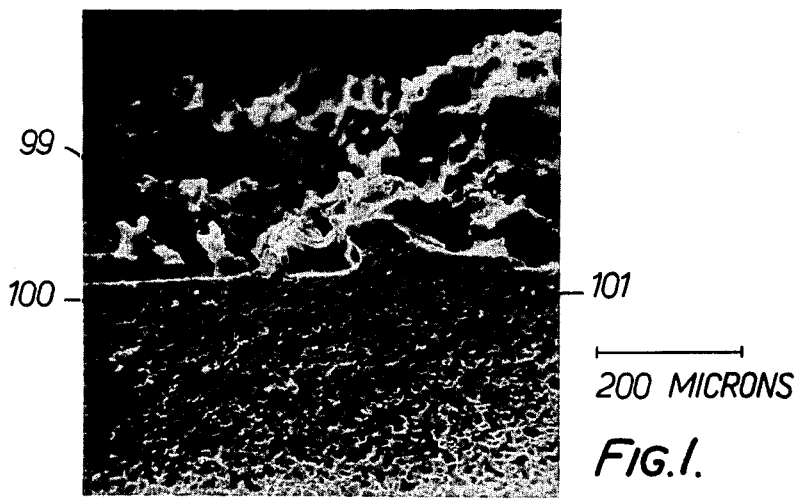
FIGS. 1 to 4 are photomicrographs of a 90° cross section of the conventional two layer product of Example 10 at about 125 times magnification and overlap to show the full thickness of the product.
Figure 2:
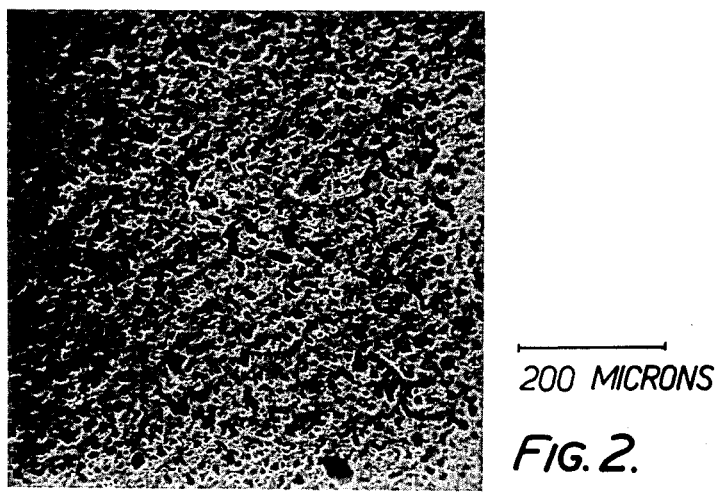
Figure 3:
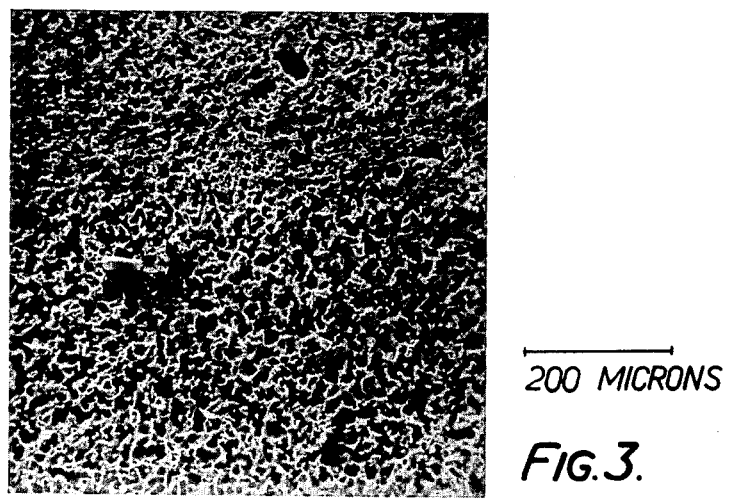
Figure 4:
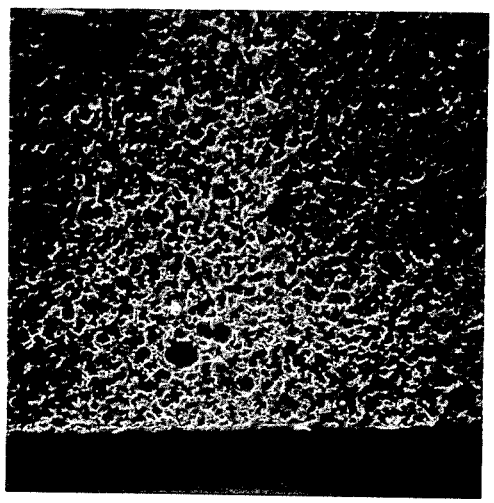

Inspection of larger areas of each of the materials at lower magnifications indicates that each of the materials of Examples 16, 18 and 20 possess the repeating more dense regions characteristic of Examples 11 and 12 but fewer numbers of such regions, whilst the material of Example 14 does not possess such areas and has a structure generally similar to that shown in FIGS. 1, 2 and 3.

The presence of small pores 1 to 5 microns across in the dense regions is readily apparent in FIGS. 18, 19 and 20. (Examples 16, 18 and 20).

It will be observed that FIG. 17 does not show any of these more dense regions whilst FIGS. 18, 19 and 20 show such regions the numbers of which increase from FIG. 18 to FIG. 20.

Each of FIGS. 1 to 12 and 17 to 20 also carries a scale beside it. These photomicrographs were taken on a Cambridge Instruments Limited Stereoscan Mark 2 electron microscope. The photomicrographs were prepared by cutting a smooth perpendicular cross section through the sheet samples. The cut surface was then coated with a thin metallic e.g., gold or palladium reflecting layer as is conventional in preparing samples for electron photomicrography. A stream of electrons was then directed on to the cut surface at 45° C and the electrons reflected from the surface also at 45° C were collected and used to produce an optical image which was photographed. It will be appreciated that the depth of focus of such photographs is very much greater than in optical photography and thus that in effect one is able to see into the voids and cavities.

EXAMPLE 1

A polyester polyurethane resin was made in solution in N,N dimethylformamide (DMF) as described below.

The polymer solution contained 32.7% solids and had a viscosity at 51° C of 1600 poise measured on a Brookfield LVT viscometer using a No. 4 spindle at a spindle speed of 1.5 r.p.m. 1005 parts were mixed and milled with 393 parts of microscopic sodium chloride particles described in more detail below, and then placed in a Z blade mixer equipped with heating facilities and heated to 51° C.

The dispersion of salt in polyurethane solution at 51° C had a viscosity of 3200 poise measured on a Brookfield RVT viscometer using a No. 7 spindle at a spindle speed of 2.5 r.p.m.

Whilst the salt dispersion in the polymer solution was maintained at 51° C 169 parts of a 1:1 by weight blend of water and DMF were added slowly over 1 hour with mixing. The viscosity of the system measured at 51° C as above increased to 8800 poise. (Brookfield RVT No. 7 spindle 2.5 r.p.m.).

The mixture was then deaired and doctor knife spread at 51° C by hand onto cold (20° C) porous polyethylene sheets at a spreading gap of 0.110 inches (2.79 mm). The layer of paste on the porous supports was then immersed in pure stationary water heated to 50° C with the coated face of the support downwards.

The material coagulated rapidly to self supporting form and could be stripped from the support without rupturing or delamination after 19 minutes. This time is referred to as the coagulation time. It was stripped after this time and immersed in stationary water at 60° C for 3 hours to substantially completely remove the DMF and reduce the sodium chloride content to less than 1000/milligrams/meter$^2$. The layer at this stage was 1.60 mms thick. After drying at 90° C for 1 hour the material was 1.3 mms thick. The material was then weighed and its density calculated from its weight per unit area and thickness as 0.51 grams/cc. Its water vapour permeability, tensile strength, initial modulus at 25% extension and tear strength were then measured by the methods described in Belgian Patent Specification No. 732482. The results are tabulated in Table 1 below.

The material also had its pore size distribution measured by mercury porosimeter, as described below and the results are given in Table 2 and are compared numerically with those of the products of the other examples in table 2 below.

When the material was cut at right angles to its surface with a razor and the cut cross section observed in good daylight by an unaided eye with 20/20 vision no voids or pores could be observed the material having a mooth matt cut surface.

It has a smooth white matt non-creasing top surface and a napped or fibrous bottom surface where the polymer was torn and drawn out on being stripped from the porous support. The top surface is readily finished by the solvent deposition spraying process disclosed in British Patent Ser. No. 1109501 to impart a regular controllable fine crease or grain break on folding back on itself. The disclosure of this specification is incorporated herein by reference.

The material had a soft handle and drape. The stiffness of the material was determined by the method described below and the results are tabulated in table 1.

The polyurethane polymer used was made in solution in dimethylformamide from a polyester by reaction with a diol and a diisocyanate under an inert atmosphere.

880 parts of pure N,N-dimethylformamide were placed in a 1500 parts reactor flushed with dry nitrogen. 0.027 parts of paratoluene sulphonic acid and 0.020 parts of dibutyltin dilaurate were dissolved in the dimethylformamide. 205.0 parts of Desmophen 2001 polyester (a hydroxyl-terminated polyester of 2000 molecular weight, having an acid number of less than 2 and a hydroxyl number of about 55. mg KOH per g made from about 1 mol butane diol-1,4, 1.13 mol ethylene glycol and 2 mols adipic acid) and 48 parts of butane diol-1,4 were then added and dissolved in the mixture and the temperature of the mixture adjusted to 25° C.

171.6 parts of 4,4-diphenylmethanediisocyanate were then added bit by bit care being taken to keep the temperature from rising above 50° C. Once the addition was complete the mixture was heated to 60° C and maintained at that temperature for 1½ hours with stirring. The excess unreacted isocyanate content was then determined by titration of an aliquot. Sufficient butane diol (3.0 parts) was then added to react essentially stoichiometrically with the unreacted isocyanate. The mixture was then maintained at 60° C with stirring and the viscosity measured periodically until it had risen to a value of about 3500 poise (Brookfield 5 or 6 spindle) as corrected to 24° C. 4.10 parts of butane diol 1,4 were then added as capping agent to terminate the reaction dissolved in 3.5 parts of N,N-dimethylformamide. The apparent viscosity at this stage of a sample at 24° C was 3400 poise, (Brookfield RVT No. 7 spindle 2.5 r.p.m.) the solids content was 32.7% the intrinsic viscosity was 1.17 and the Huggin's slope constant $k'$ of the viscosity number plot was 0.56.

The sodium chloride (or indeed other equivalent preferably water soluble removable filler) was ground in a pin and disc mill with air classificiation to separate out fines and return oversize particles for regrinding. The sodium chloride powder before dispersing in the polymer solution typically had an average particle size of the order of 10 to 20 microns usually about 13 to 17 microns with a standard deviation of the order of ±10 microns. This measurement was made by sedimentation measurements using a Photo-extinction Sedimentometer manufactured by Evans Electro-Selenium Ltd., Model No. 41 used in accordance with the manufacturer's instructions based on papers by H. E. Rose in Engineering of March 31 and Apr. 14, 1950 and Nature of 1952, Volume 169, page 287.

This apparatus consists of a chamber in which the solid whose particle size is to be measured can be dispersed ultrasonically in a liquid and its rate of settling measured optically. The change in transmission of light by the dispersion with time is related to the particle sizes of the particles and the measurements of this change enable the average particle size to be calculated.

It will be appreciated that these sedimentometer experiments give an indication of the general order of particle size of the majority of the particles.

Shadow photography of typical samples of the ground salt has indicated that the salt particles have random rough irregular shapes including quite elongated shapes as well as more compact cube or block shapes.

The dispersions typically contain a few particles having a maximum dimension as large as 70 microns but substantially all of the particles are less than 40 to 50 microns, and most are less than 25 to 30 microns in maximum dimension and have dimensions in the range down to 1 micron or so though a few may be even smaller. The salt is also selected to have a low moisture content so that it does not cake, for example less than 0.5% and especially in the range 0.2 - 0.4%. It may also have an anticaking agent added namely MICROCAL at about 1% by weight. MICROCAL is a very fine particle size coprecipitated lime and silicate anticaking agent sold by Joseph Crosfield & Sons Limited. The mixing and milling conditions are preferably carried out at relative humidities less than 70% at 25° C and preferably at about 50%.

One particular material suitable for use as the porous support which is both self supporting and has a degree of flexibility and gives a very good flesh surface appearance, is a porous liquid permeable sintered polymeric plastics material especially one made from high density polyethylene and preferably having an average pore size of 50 microns and more broadly 25 to 100 microns as measured by the method described in B.S.S. 1752: 1963 using $n$ propyl alcohol.

The porous polyethylene (or other suitable porous support which may be a tensioned woven belt and can be made of polymer or metal or combinations thereof) is very suitably one sold by Porvair Limited under the Trade Mark Vyon (filter grade).

This material is 0.067 inch ± 0.004 inch thick, has a permeability of 18 ± 4 cubic ft./min. air at a pressure of 8 inches static water guage, weighs 114 grams/sq. ft, has an ultimate tensile strength of about 115 kg/cm.$^2$ and an elongation at break of less than 25%.

This material is formed by spreading an even layer of Ziegler high density polyethylene powder on a smooth metal surface and then placing the smooth metal surface and the layer in a suitably heated oven to cause the particles to sinter. The surface of the resultant sintered sheet which was in contact with the smooth metal surface is smoother than the other face and it is on this smoother face that the layer is formed.

EXAMPLE 2

The procedure used in this example was the same as that used in Example 1 except that the layer of hot mixture on the porous support was coagulated in water at 30° C and the coagulation time was longer at 27 minutes.

The products cross sectional appearance, surface appearance and handle were closely similar to the product of Example 1. The products physical properties are tabulated in Tables 1 and 2 as for Example 1.

EXAMPLE 3

This is the same as Examples 1 and 2 except that the coagulation temperature was 20° C, the coagulation time being 32 minutes.

EXAMPLE 4

1400 parts of the polyurethane solution used in Example 1 were heated in the Z blade mixer to 51° C and 235 parts of the same 1:1 DMF water blend slowly added with mixing over 1 hour. The viscosity of the mixture measured at 51° C on a Brookfield LVT viscometer using a No. 4 spindle at a spindle speed of 1.5 r.p.m. fell to 900 poise. Measurements at spindle speeds of 0.6, 1.5 and 3.0 r.p.m. all gave readings of 900 poise indicating that the system was not thixotropic.

The mixture was then deaired spread and coagulated as in Example 1 i.e., at 50° C and had a coagulation time of 23 minutes and a wet thickness before drying of 2.0 mm. The same physical properties as for Example 1 were measured and are tabulated in Tables 1 and 2. The product had substantial numbers of elongated voids or macrovoids aligned transverse to the plane of the sheet, i.e., through its thickness, which were visible to the naked eye in ordinary daylight. The macrovoids were about 0.1 to 0.2 mm wide and about 0.5 to 1.0 mm long. The material had about 25 such macrovoids per cm of the cut surface. Microscopic examination at about 120 fold magnification also indicated that the top surface had many fewer voids (microvoids) than did the products of Examples 1, 2 and 3. The material had a non-matt slightly shiny blotchy top surface which creased on being folded back on itself.

The material was also stiffer than the products of Examples 1, 2 and 3 and had a less soft handle and less leather-like drape. The flexural rigidity G quoted in table 1 is a measure of the stiffness that is appreciated when the material is handled. The material also has a smaller pore diameter but greater porosity or total void volume than the products of Examples 1, 2 and 3 as shown in Tables 1 and 2.

EXAMPLE 5

Example 3 was repeated except that the coagulation temperature was 30° C as in Example 2, the coagulation time being 28 minutes.

The product resembled that of Example 4 and its properties are tabulated in Tables 1 and 2.

EXAMPLE 6

Example 4 was repeated except that the coagulation temperature was 19° C i.e. similar to Example 3, the coagulation time being 41 minutes.

The product resembled that of Examples 4 and 5 but had the stiffest feel of these three examples. Its properties are tabulated in Tables 1 and 2.

EXAMPLE 7

A polymer solution containing 32.8% resin solids made as described in Example 1 and having an apparent viscosity of 3650 poise at 25° C (Brookfield LVT viscometer No. 7 spindle 2.5 r.p.m.) and intrinsic viscosity of 1.21 and slope constant $k'$ of 0.51 was mixed and milled with microscopic sodium chloride as described in Example 1 to give a salt to polymer weight ratio of 1.6:1. The mixture also contained 0.5% carbon black. The Polymer salt paste was made at 50° C. The paste was spread at 50° C at 0.110 inches gap width on cold (20° C) porous polyethylene sheet. The spreading was achieved using a knife over roll coating device as described in British Patent specification No. 1220218 and published Belgian Pat. No. 709259, the disclosures of which are incorporated herein by reference.

The porous polyethylene sheet 403 is lead around a roll 404 about 18 inches in diameter. Three knife blades 409, 406, 412 with side cheeks 410, 411, 414, 415 are arranged around the top quadrant of the roll to form two troughs 408 and 413 the middle blade being common to the substrate trough 408 and the topcoat trough 413. The separation of the blade 406 from the surface of the sheet 403 determines the substrate spread thickness and the additional separation of the blade 412 determines the top coat thickness (if any).

In this example the paste is placed in the trough 408. The layer on the support was then immersed in water as in Example 1 but at 30° C and had coagulated and could be stripped from the support as in Example 1 after 34 minutes, and was leached as in Example 1.

The physical properties of the product are tabulated in Table 1.

EXAMPLE 8

A polymer solution as in Example 7 was mixed and milled with microscopic sodium chloride as in Example 1 to give a salt to polymer ratio of 1.2:1 the system being maintained at 50° C. The mixture again contained 0.5% carbon black. The dispersion then had a 1:1 water/DMF blend added as in Example 1 so that 10% w/w of added water based on DMF and added water was present in the system.

The paste was then spread coagulated and leached as in Example 7. The coagulation time fell to 21 mins. The physical properties of the material are given in Table 1.

EXAMPLE 9

Example 8 was repeated except that the ratio of salt to polymer was lowered to 1.0:1 and the amount of water added raised to 12%. The temperature of the paste had to be raised to 60° C to avoid gelling or coagulation.

The paste was then spread, coagulated and leached as in Example 9. The coagulation time was 19 minutes. The physical properties of the product are given in Table 1.

EXAMPLE 10

The same substrate formulation was used as in Example 7. A top coat paste consisting of the same polyurethane as the substrate as a 25% solution in dimethylformamide with 3:1 parts by weight based on polymer of the same microscopic sodium chloride dispersed through it and containing 5% w/w of carbon black was spread simultaneously with and on top of the substrate paste using the spreading device described in Example 7 with the top coat paste in the trough 413.

After leaching and drying the product was sprayed with dimethylformamide containing about 3.5% of the same polyurethane and about 0.5% carbon black with a simultaneous blast of hot air directed along the sprayed surface. The mixture was applied so that the dry weight of the material increased by about 2 grams per meter$^2$.

FIGS. 1 to 5 as mentioned above are photomicrographs of the product of this example.

Figure 5:
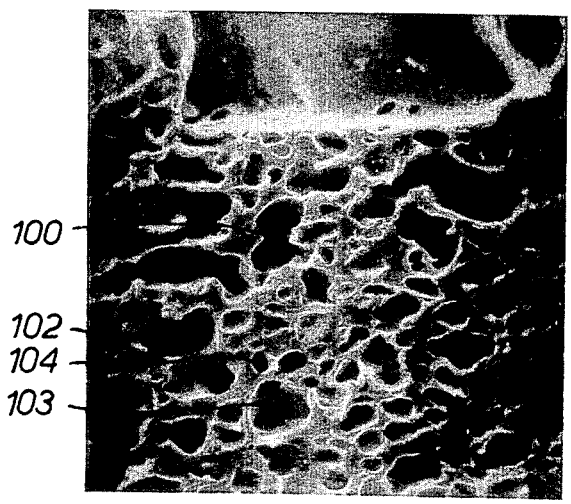
FIG. 5 is a view of part of FIG. 1 at about 620 times total magnification.

As can be seen from FIGS. 1 and 2 and 5 the substrate having a flesh surface 99 has an even microporous structure consisting largely of compact voids 100 which are 10 to 30 or 40 microns in maximum dimension in the plane of the cross section with some larger more irregular shaped voids 101 up to 50 or 60 microns most voids being in the range 20 to 40 microns in maximum dimension in the plane.

These voids are separated by walls 102 generally up to 10 microns thick but usually in the range 1 to 5 microns, the walls having pores usually 3 to 10 e.g., 3 to 5 microns across which connect adjacent voids to each other. Only rarely are the voids which are 20 to 40 microns across separated in the plane of the cross section from pores of a similar size by distances greater than 10 microns without there being an intervening hole, e.g., 104 either pore or void in the plane of the cross section which is at least 3 or even 5 microns across. (In the products of Examples 11 and 12 below the walls between voids tend to be thicker and to contain more holes which tend to be smaller).

EXAMPLE 11

The same substrate formulation was used as in Example 8 and the same top coat formulation as in Example 10, and a two layer material was made as in Example 10.

FIGS. 6 to 9 as mentioned above are photomicrographs of the product of this example.

As can be seen in FIGS. 6 and 7 the structure is evenly microporous but the voids 110 tend to be larger than in the Example 10 product and somewhat more serpentime and elongated in character e.g., 111. The elongation tends to be in the plane of the sheet rather than transverse to it. Most of the large pores 111 have maximum dimensions in the plane of the cross section of 30 to 80 microns and in particular 30 to 50 microns though some of the serpentine or elongated pores 112 may be as long as 100 to 120 microns though they are usually not more than 10 or 20 microns across and are generally of uneven width, (Unlike the elongated pores of the products of examples 4, 5 and 6 which are fairly even in cross section and are aligned generally perpendicular to the plane of the sheet).

The voids are separated by thicker walls than is the case with Example 10 often being as thick as 25 microns, though more usually in the range 5 to 10 microns. The pores in the cut areas of the walls are also generally smaller and more numerous than in the product of Example 10 being usually in the range 2 to 5 microns and rarely more than 10 microns.

EXAMPLE 12

The same substrate formulation was used as in Example 9 and the same top coat formulation as in Example 10 and a two layer material was made as in Example 10.

As can be seen in FIGS. 10 and 11 the structure is again evenly microporous and generally similar to the structure of Example 11 though the voids 120 tend to be somewhat larger than in Example 11 though of the same general magnitude.

The further slight difference from Example 11 is that the elongated voids appear to tend to be orientated in the plane of the sheet more than is the case in Example 11. In addition the walls 121 between the voids seem to be thicker tending to 5 or 10 to 30 or 40 microns thick and the cut areas of the walls show large numbers of small cells 122 which are mostly 1 – 3 microns in maximum size and appear to be partially collapsed (see FIG. 12) and may include closed cells not intercommunicating with voids or pores. FIG. 12 shows a compact void 124 about 35 microns across communicating with a smaller void 125 about 20 microns long via a pore 126 about 5 microns across in the wall 127 which is about 15 microns thick between the void 124 and the void 128 and about 6 microns thick between the void 124 and the void 129.

(The crack in the wall 127 is thought to be a crack in the deposited metallic coating rather than in the polymer since such cracks are quite often observed with this type of deposited metallic coating).

The area occupied by voids e.g., such as voids 124, 128 and 129 in excess of 10 microns across in the plane is about 40% of the total area by consideration of FIG. 10.

EXAMPLE 13

Example 8 was repeated except that the ratio of salt to polymer was 1.4:1 w/w and the amount of water added was 2%. The physical properties are given in table 1.

EXAMPLE 14

The same substrate formulation was used as in Example 13 to produce a two layer material using the topcoat formulation and techniques of Example 10. The smoothness of the topcoat as compared with the other two layer examples is ranked in Table 1.

EXAMPLE 15

Example 13 was repeated using 4% added water.

EXAMPLE 16

Example 14 was repeated using the substrate formulation of Example 15.

EXAMPLE 17

Example 13 was repeated using 6% added water.

EXAMPLE 18

Example 14 was repeated using the substrate formulation of Example 17.

EXAMPLE 19

Example 8 was repeated except that the amount of added water was 8%.

EXAMPLE 20

Example 14 was repeated using the substrate formulation of Example 19.

Table 1

| Example | 1. | 2. | 3. | 4. | 5. | 6. | 7. |
|---|---|---|---|---|---|---|---|
| Salt/polymer (A) | 1.2:1 | 1.2:1 | 1.2:1 | — | — | — | 1.6:1 |
| water added (B) | 10 | 10 | 10 | 10 | 10 | 10 | — |
| Coagulation temperature (° C) | 50 | 30 | 20 | 50 | 30 | 19 | 30 |
| Time (minutes) | 19 | 27 | 32 | 23 | 28 | 41 | 34 |
| Substrate thickness wet coagulated (mm) | 1.6 | 1.7 | 1.7 | 2.0 | 2.0 | 2.1 | |
| dry (mm) | 1.3 | 1.4 | 1.4 | 1.7 | 1.8 | 1.9 | 1.20 |
| Top Coat Thickness dry (mm) | — | — | — | — | — | — | — |
| Density (C) | 0.51 | 0.51 | 0.54 | 0.43 | 0.42 | 0.42 | 0.52 |
| Tensile strength (D) | 13.9[1] | 14.2[1] | 15.9[1] | 8.9[1] | 7.9[1] | — | 15.2[1] |
| Initial Modulus (E) | 2.8[1] | 2.6[1] | 3.2[1] | 2.5[1] | 1.9[1] | — | 4.1[1] |
| Tear Strength (F) | 5.1[1] | 5.1[1] | 5.2[1] | 4.7[1] | 4.3[1] | — | 6.8[1] |
| WVP (G) | 140 | 120 | 120 | 40 | 30 | — | — |
| Flexural rigidity (H) L direction | 43 | 31 | — | 43 | 66 | 74 | — |
| X direction | 23 | 23 | — | 65 | 57 | 173 | — |
| % water (I) | | 5.9 | | | 7.8 | | 0.7 |
| % salt (J) | | 25.1 | | | — | | 34.3 |
| % polymer solution (K) | | 69.0 | | | 92.2 | | 65.0 |
| Porosity (M) | 59 | 64 | 59 | 66 | 66 | 66 | 56 |
| Mean pore diameter (N) | 12.0 | 14.0 | 10.8 | 1.0 | 1.2 | 1.3 | 4.0 |
| Surface appearance (P) | | | | | | | |

| Example | 8. | 9. | 10. | 11. | 12. | 13. | 14. |
|---|---|---|---|---|---|---|---|
| Salt/polymer (A) | 1.2:1 | 1:1 | | | | | 1.4:1 |
| water added (B) | 10 | 12 | | | | | 2 |
| Coagulation temperature (° C) | 30 | 30 | | | | | 30 |
| Time (minutes) | 21 | 19 | | | | | 33 |
| Substrate thickness dry (mm) | 1.07 | 1.05 | | | | | |
| Top Coat Thickness dry (mm) | — | — | | | | | |
| Density (C) | 0.55 | 0.53 | | | | | 0.50 |
| Tensile strength (D) | 15.2[1] | 15.8[1] | | | | | 10.8[1] |
| Initial modulus (E) | 3.7[1] | 4.3[1] | | | | | 3.2[1] |
| Tear Strength (F) | 5.9[1] | 6.4[1] | | | | | 6.5[1] |
| WVP (G) | | | | | | | |
| Flexural rigidity (H) L direction | | | | | | | |
| X direction | | | | | | | |
| % water (I) | 5.9 | 7.4 | | | | | 1.6 |
| % salt (J) | 25.1 | 21.3 | | | | | 30.8 |
| % polymer solution (K) | 69.0 | 71.3 | | | | | 67.6 |
| Porosity (M) | 54 | 53 | | | | | |
| Mean pore diameter (N) | 8.1 | 8.0 | | | | | |
| Surface appearance (P) | | | 7 | 1 | 2 | | 6 |

| Example | 15. | 16. | 17. | 18. | 19. | 20. |
|---|---|---|---|---|---|---|
| Salt/polymer (A) | 1.4:1 | | 1.4:1 | | 1.2:1 | |
| water added (B) | 4 | | 6 | | 8 | |
| Coagulation temperature (° C) | 30 | | 30 | | 30 | |
| Time (minutes) | 29 | | 26 | | 24 | |
| Substrate thickness dry (mm) | | | | | | |
| Top Coat Thickness dry (mm) | | | | | | |
| Density (C) | 0.49 | | 0.47 | | 0.53 | |
| Tensile strength (D) | 9.2[1] | | 9.6[1] | | 12.1[1] | |
| Initial modulus (E) | 3.0[1] | | 2.8[1] | | 3.4[1] | |
| Tear Strength (F) | 6.6[1] | | 6.3[1] | | 6.3[1] | |

Table 1-continued

| WVP (G) | | | |
|---|---|---|---|
| Flexural rigidity (H) L direction X direction | | | |
| % water (I) | 2.5 | 3.5 | 4.8 |
| % salt (J) | 30.1 | 29.5 | 25.8 |
| % polymer solution (K) | 67.2 | 67.0 | 69.4 |
| Porosity (M) | | | |
| Mean pore diameter (N) | | | |
| Surface appearance (P) | 5 | 4 | 3 |

Notes on Table 1.
[1]results adjusted to 1.4 mm sample thickness.
(A) This is the ratio in parts by weight
(B) This is the amount of water added to the polymer solution based on the added water and DMF content. (It has been observed that due presumably to the highly hygroscopic nature of both finely divided sodium chloride and DMF the pastes prior to the addition of the DMF water blend commonly already contain 1 to 1.5% w/w of water).
(C) grams per cc. obtained by weighing a measured area of the sheet product of measured thickness.
(D) Kg per cm.
(E) at 25% extension in Kg per cm.
(F) Kg
(G) Water vapour permeability in grams per meter$^2$ per hour at 100% relative humidity and 37° C
(D), (E), (F) and (G) are measured by the methods set out in Belgian Patent 732482.
(H) FLexural rigidity G is measured in milligram centimeters by a method based on British Standard Specification No. 3356:1961 and an article by Chauncey C. Chu et al in Textile Research Journal for August 1950 entitled "Mechanics of Elastic Performance of Textile Materials Part 5"

A sample is cut from the material in the L and X directions, each sample being about 2 cms wide and 15 cms long. Its stiffness is then measured with its top surface and its bottom surface uppermost in turn and the average value quoted. The sample is supported in a fixed angle flexometer on a horizontal plane with one end extending over the edge of the platform at right angles to that edge. Sighting lines are drawn down at a slope from this edge, the slope being 41.5°. The strip is pushed out over the edge until the end of the overhanging part reaches the plane of the sighting lines having bent under its own weight. The overhanging length X is measured and the weight W of a 10 cm by 10 cm sample is measured. The flexural rigidity G is determined from the equation $G = 0.1 \times W \times X^3$ milligram centimeters.

I. % water This is the w/w % of water based on the total weight of the formulation taking salt density as 2.16 and polymer solution density as 1.0 and assuming the system to contain 1% absorbed water prior to the addition.
J. % salt This is the w/w % of salt based on the total weight of the formulation.
K. % polymer solution This is the w/w % of polymer solution based on the total weight of the formulation.
M. Porosity First the apparent volume of the sample is determined by geometry. The true volume of solid in the sample is determined by evacuation of the sample followed by introduction of helium to atmospheric pressure and the volume so introduced is measured. The difference between the apparent and true volume gives the total void volume or porosity (X).
N. Mean pore diameter and pore size The term pore size or pore diameter used herein is the value obtained by the following experimental method. Pore size in this sense is not the maximum dimension of the voids in the material but reflects the dimensions of the holes or pores in the walls surrounding or defining the voids, which holes provide intercommunication between the voids. The pressure required to force mercury through a pore is inversely proportional to the pore diameter. The volume of mercury forced through the pore into the void is equal to the volume of the pore and the void. The porosity of a sample is plotted against the pore size by observation of the volume of mercury which can be forced into the sample at set pressures. The total void volume (see (M) above) is composed of pores and larger voids entered by such pores covering the full range of pore diameters each of which requires mercury at definite pressures to fill it. By presetting the mercury pressures (P) the volume (V) of mercury forced in is determined and hence the ratio at that pressure of $V_p/X$ is determined. This is the porosity at that pore size. By altering the mercury pressure the porosity can be plotted as a function of pore diameter. This will level off at some value which is the total porosity of the sample i.e., all pores and voids are filled with mercury. 0.03 microns is considered as the lowest diameter. The value so obtained is in very close agreement to other methods but has the advantage of showing the range of pore diameters. The point of inflection in the curve is taken as the mean pore diameter (see FIG. 1).

P. Surface appearance Two layer materials especially when given a fine grain surface finish as in Examples 10, 11, 12, 14, 16, 18 and 20 have a tendency to a greater or lesser extent to exhibit small repeated undulations in the finished surface which are particularly noticeable when the surface is viewed in reflected light. Examples 10, 11, 12, 14, 16, 18 and 20 have been compared with each other visually and have been ranked in Table 1, the material with the most undulating surface being ranked 7 and the material with the least undulating surface ranked 1. This appearance has been graphically described as "orange peel" in that the undulations have a general resemblance to those on the surface of an orange (though in the above examples the appearance was considerably less marked than an orange). The term orange peel has been used in the art to describe the appearance adopted by some man made shoe upper materials on lasting. The present effect herein termed "prelasting orange peel" is observed in most materials even before lasting occurs and is much less marked than orange peel after lasting. It will be observed that the control example 10 has the most marked "prelasting orange peel" being ranked 7 whilst Example 11 has the least marked (indeed almost absent) prelasting orange peel being ranked 1.

Table 2

| Example % of total porosity provided by pores in diameter range: | 1 | 2 | 3 | 4 | 5 | 6 | 7 | 8 | 9 |
|---|---|---|---|---|---|---|---|---|---|
| 400–200 | 1.7 | 3.9 | 2.5 | 2.0 | 1.0 | 1.0 | — | — | — |
| 200–100 | 4.2 | 10.1 | 3.4 | 2.0 | 1.5 | 1.5 | 7.2 | 7.4 | 7.5 |
| 100–50 | 3.4 | 2.4 | 2.5 | 1.5 | 1.5 | 0.8 | 2.7 | 4.6 | 3.8 |
| 50–25 | 1.7 | 0.8 | 1.5 | 0.5 | 1.2 | 0.8 | 1.8 | 0.5 | 0.5 |
| 25–12.5 microns. | 44 | 47 | 37 | 1.5 | 1.5 | 1.5 | 1.8 | 2.8 | 6.6 |
| 12.5–6.4 | 35.5 | 23.5 | 39 | 1.5 | 0.8 | 0.8 | 2.7 | 61 | 53 |
| 6.4–3.2 | 5.9 | 3.9 | 7.6 | 3.0 | 3.8 | 3.8 | 55.5 | 15.7 | 17.0 |

Table 2-continued

| Example % of total porosity provided by pores in diameter range: | 1 | 2 | 3 | 4 | 5 | 6 | 7 | 8 | 9 |
|---|---|---|---|---|---|---|---|---|---|
| 3.2–1.6 | 3.4 | 3.1 | 2.5 | 7.6 | 2.3 | 2.7 | 14.3 | 2.8 | 3.8 |
| 1.6–0.8 | 1.7 | 0.8 | 1.7 | 54.5 | 46 | 42.5 | 5.4 | 1.9 | 1.9 |
| 0.8–0.4 | 1.7 | 1.6 | 1.7 | 21 | 18 | 17 | 5.4 | 1.9 | 1.9 |
| 0.4–0.2 | 1.7 | 2.4 | 1.7 | 5.3 | 3.0 | 3.0 | 6.3 | 2.8 | 2.8 |
| 0.2–0.1 | 1.7 | 1.5 | 1.7 | 2.0 | 1.0 | 2.0 | 1.8 | 1.9 | 1.5 |
| 0.1–0.05 | 0.5 | 1.4 | 0.8 | 0.5 | 0.5 | 1.8 | 1.9 | 1.9 | 1.0 |

Consideration of tables 1 and 2 indicates that the addition of 10% water to a 32% solids polymer solution at 50° C and subsequent coagulation produces a macroporous or macrovoid material i.e., containing large pores, of low density and strength and high total void volume or porosity but also of low water vapour permeability, but the coagulation is rapid (Examples 4, 5 and 6).

The combination of water and salt thus obtains the advantages of water, rapid coagulation, and salt, strength and high WVP, used separately but avoids the disadvantages (macrovoids and slow coagulation respectively).

As discussed above the materials made using salt and added water have a smoother surface than the material made using salt only.

FIG. 13 demonstrates the remarkable differences in viscosity properties which are observed in formulations in accordance with the present invention.

FIG. 13 is a graph of viscosity in poise against resin solids concentration all viscosities being at 50° C. Curve 231 is for a 32% polymer solution of the type described in Example 1 each of the points 311, 312, 313, 314, 315, 316 and 317 indicating an increasing addition of DMF 311 being 0% added DMF, 312 being 2% added DMF and 317 being 12% added DMF thus resulting in stepwise dilution of the initial polymer solution.

Curve 232 is for a similar polymer of slightly different initial concentration. Here each of the points 321 to 327 indicate an increasing addition of water as a 50/50 water DMF blend. 0% water being added at point 321 and 12% water being added at point 327. It will be appreciated as water is added an equal amount of DMF is also added thus point 314 corresponds to point 327 so far as dilution of the polymer solution with DMF is concerned. It will be observed that the added water appears to have little if any effect on the viscosity of these polymer solutions under these conditions. Thus the viscosity at 327 is 860 poise and at 314 is 910 poise. Points 312 and 323 and 313 and 325 are similar pairs of points.

Curve 231 and 232 were measured with a Brookfield LVT viscometer using a No. 4 spindle at 3.0 r.p.m.

Curve 233 was measured on a Brookfield RVT viscometer using a No. 7 spindle at 2.5 r.p.m. The curve is for a 32% resin solids polymer solution similar to that described in Example 1. containing 1.2:1 w/w of microscopic sodium chloride based on polymer. Points 331 to 336 are for water additions from 0% to 10% respectively added as a 50/50 water DMF blend at 50° C as for curve 232.

The viscosity in the range 0 to 2% added water shows an initial period up to about 1% added water when the viscosity does not increase rapidly; thereafter it suddenly increased so that at 2% added water (probable actual water content 3 to 3.5% based on water and DMF) it has risen to over 8000 poise from an initial value at 0% added water (probably 1% to 1.5% actual water content based on water and DMF) at 3200 poise. Thereafter it remains in the region 8000 to 10,000 poise until at about 12% added water the viscosity is no longer measurable with a Brookfield viscometer because the material separates away from the rotating cylinder forming a small cavity in which the cylinder rotates increasingly freely resulting in the instrument indicating an apparent rapid fall off in viscosity.

When curve 232 is repeated using a saturated solution of sodium chloride in the 50/50 DMF water blend (contains 38% sodium chloride at 50° C) the results are an almost exact fit on curve 232.

It is believed that if the paste formulation indicated by point 331 were diluted with pure DMF as in curve 231 a curve 234 generally of the same order of slope as curves 231 and 232 would be produced.

The use of a combination of salt and water also has a useful and unexpected effect on the viscosity of the pastes reducing the problems which would be encountered in trying to spread the pastes at elevated temperature.

Thus considering FIG. 14 curve 241 is the viscosity of a 1.6:1 salt resin 32.7% resin solids formulation (containing between 1 and 1.5% absorbed water (based on water and DMF) as explained above) at 20.5° C. The viscosity remains about 7500 poise from a spindle speed of 2.5 r.p.m. right up to a speed of 17 r.p.m.

Curve 242 is for the same formulation but at a temperature of 52° C. The viscosity has fallen to the region of 2400 poise and remains at about this figure over the same range of spindle speeds.

A viscosity as low as this might result in excessive settling of the paste into the support and produce difficulties in spreading thick films e.g. 2 mms or so thick in the wet state.

Curve 243 is for the same polymer solution but containing 1.4:1 salt and 8% of added water. The viscosity measurement is at 54° C.

Curve 244 is for the same polymer solution containing 1.4:1 salt and 12% added water the viscosity being measured at 52° C.

Curve 245 is for the same polymer solution containing 1.2:1 salt and 8% added water as in Example 19 the viscosity being measured at 51° C. The viscosity of the system at a shear rate of 1 r.p.m. is about 13000 poise but drops very rapidly so that at 2.5 r.p.m. it is of the same order as the formulation free of water, curve 241 at 20.5° C thus enabling the paste to be spread but then holding its as spread configuration better.

The fact that at 10 r.p.m. the viscosity has fallen to about 3500 poise means that pumping of the paste will be facilitated.

Curve 246 is for the same polymer solution containing 1.2:1 salt and 12% added water, the viscosity being measured at 52° C.

Curve 247 is for the same polymer solution containing 1.2:1 salt and 10% added water, the viscosity being measured at 54° C.

Curves 246 and 247 are similar to curve 245 in shape and the formulations have the same advantages.

FIG. 15 is a graph plotting % of water added from 0% to 4% against viscosity for a 32% resin solids polyurethane solution in DMF containing 1.2:1 parts by weight of microscopic sodium chloride. The paste had an initial water content of 1.01% by weight based on the total DMF water content.

The viscosity is given in poise $\times 10^3$ and was measured on a Brookfield RVT viscometer using a No. 7 spindle at 27° C. Curve 251 is at 1.0 r.p.m. curve 252 is at 2.5 r.p.m., curve 253 is at 5.0 r.p.m. The paste has a constant viscosity at these speeds up to about 2.0% total water content (based on water and DMF) but at this point the viscosity suddenly rises and has doubled at 5% total water content at 1.0 r.p.m. whilst the increases are lower at the higher spindle speeds.

FIG. 16 is a triangulation diagram showing the percentage of salt water and polymer solution on a weight basis. Point 261 is Example 2 and Example 8 and Example 11. Point 262 is Example 5. Point 263 is Example 9 and Example 12. Point 264 is Example 7 and Example 10. Point 265 is Examples 19 and 20. Point 266 is Example 13 and 14. Point 267 is Example 15 and 16. Point 268 is Example 17 and 18.

The particular strength and wear characteristics required for the end use of the man-made leather-like material will determine the particular polymer formulation to be used.

For shoe uppers high abrasion resistance and tear strength combined with a reasonable extensibility and initial modulus to provide proper wear comfort on the foot are required.

Many thermoplastic polymers can be used, for such purposes for example polyvinylchloride and its copolymers, acrylonitrile polymers and copolymers and polyurethanes or blends of one or more of these. However we prefer elastomeric polyurethanes.

The elastomeric polyurethane may be used on its own or as blends with minor proportions say up to 49% preferably less than 20% of polyvinyl chloride and other polymers and copolymers such as nitrile rubbers including solid copolymers of butadiene and acrylonitrile.

Other polymers which have been suggested for use in man-made leather-like materials include polyacetal resins, vinyl halide polymers (including copolymers with other ethylenically unsaturated monomers), polyamides, polyesteramides polyesters, polyvinyl buyral, polyalphamethylstyrene, polyvinylidene chloride, polymers of alkyl esters of acrylic and methacrylic acids, chlorosulphonated polyethylene, copolymers of butadiene and acrylonitrile, cellulose esters and ethers, polystyrene and other polymers made from monomers containing vinyl groups, and blends of them with elastomeric polyurethanes can be used.

The preferred polymers however are elastomeric polyurethanes having recovery properties intermediate between pure rubbers and pure thermoplastic materials at room temperature.

The article by Schollenberger Scott and Moore in "Rubber Chemistry and Technology" Vol. XXXV, No. 3, 1962 pages 742 to 752 at page 743 and in FIG. 3 indicates the long so-called half lives of the polyester urethanes made from adipic acid, 1,4 butane diol and diphenyl methane — p,p' — diisocyanate by the methods disclosed in U.S. Pat. No. 2871218 and sold under the Trade Mark ESTANE 5740. These two disclosures are incorporated herein by reference.

Polyurethanes may be based on a wide variety of precursors which may be reacted with a wide variety of polyols and polyamines and polyisocyanates. As is well known the particular properties of the resulting polyurethanes to a large extend can be tailored by suitable choice of the reactants, reaction sequence and reaction conditions.

The preferred polymers are elastomeric polyurethanes based on a linear, hydroxyl terminated polyester (although a polyether or a polyether/polyester blend may be used) and a diisocyanate, with a small addition of a difunctional low molecular weight reactant. The last mentioned component may be added either with the other reactants at the start of a one-step polymerisation or at a later stage when it will act primarily as a chain extender.

This type of polyurethane having thermoplastic properties is particularly preferred for use in producing shoe uppers. Particularly preferred polyurethanes are those derived from polyesters by reaction with diols and diisocyanates. As is known from United States Patent Specification No. 2871218. mentioned above many different polyesters, diols and diisocyanates can be used, but a particularly suitable polyurethane system is one in which a polyester made from ethylene glycol and adipic acid is reacted with 1,4-butylene glycol and with 4,4'-diphenylmethane diisocyanate.

In the system in accordance with the above specification the mole ratio of polyester and diol can vary between quite wide limits but the combined mole ratio of polyester and diol is arranged to be essentially equivalent to the mole ratio of diisocyanate so that the resultant polymer is essentially free of unreacted hydroxyl or isocyanate groups.

Polymers of this type but having an improved Shore hardness can be made by using a slight excess of diisocyanate and also by using a copolyester as by replacing part of the ethylene glycol in the above system by 1,4-butylene glycol.

A further alternative polyurethane system which has been found particularly suitable uses polyester derived from caprolactones. Such polyurethanes are described in British Patent Specification No. 859640, the disclosure of which is incorporated herein by reference.

The polymers may be produced by a bulk polymerization process and subsequently dissolved in suitable solvents or may be prepared directly in solution by a solution polymerization process The polymer can include conventional stabilizers, fillers, processing aids, pigments, dyes additives and surface active agents for example proofing or wetting agents, and when the polymer content is quoted in the claims this includes any such additives which may replace up to 15% w/w of the polymer.

A particularly preferred polyurethane is that made by the novel solution polymerization process disclosed in U.S. Pat. Spec. Ser. No. 819337, Belgian Pat. No. 742471 the disclosure of which is incorporated herein by reference. Such polyurethanes are characterised by having intrinsic viscosities in the range 0.9 to 1.4.

The intrinsic viscosity is determined in highly dilute solution in analytical grade DMF which has been thoroughly dried by storage under a nitrogen atmosphere over a molecular sieve (Linde 5A). Four measurements at 25° C corresponding to four, approximately equally spaced, concentrations are made and intrinsic viscosity and polymer solvent interaction parameter are determined by the Huggins equation:

$$\frac{\eta_{sp}}{C} = [\eta] + K^1[\eta]^2 C$$

where $\eta_{sp}$ is the specific viscosity and C is concentration expressed in g/100 ml, and $[\eta]$ is the intrinsic viscosity.

For use in making shoe upper materials the preferred polyurethanes have melting points of at least 100° C preferably about 150° C (e.g., about 170° to 200° C, as measured by differential thermal analysis or differential scanning calorimetry). When formed into a smooth void-free thin film 0.2–0.4 mm in thickness (by carefully casting a degassed solution in dimethylformamide and then carefully evaporating off the solvent in a dry atmosphere) they have the properties described below; a tensile strength of at least 210 kilograms per square centimeter (preferably at least 350 e.g. about 420 to 560) a percent elongation at break of at least 300% (preferably at least 400% e.g., about 500 to 700%) an elastic modulus of at least 105 kilograms per square centimeter (preferably at least 350 e.g., about 560 to 770) a 100% secant modulus (stress divided by strain at 100% elongation) of at least 28 kilograms per square centimeter (preferably at least 84, e.g., about 110 to 134). These mechanical properties are measured by ASTM D882-67.

The preferred polyurethane (again, tested as a thin film made as described above) recovers completely from a 5% elongation at room temperature (23° C) but preferably does take on a permanent set (one measured for example as in an ASTM D412-66) after 100% elongation. This set is usually within the range of about 5 to 20%, as in the range of about 10 to 20% e.g., about 15%. The "permanent set" is usually measured an hour after the release of stress; for example, a material which shows a tension set of some 24 – 26% immediately on release of the clamps after being held at the 100% elongation for 10 minutes will have a tension set of 14% measured 1 hour after the release of the clamps. (In the measurement a film specimen 1 cm wide with a guage lengh of 5 cm is strained to the 100% elongation at a rate of 254% per minute). Preferably the material has a Shore hardness of at least 75A (more preferably about 90A to 60D), measured by ASTM D1706-67.

The amount of non-solvent added is at least that which in combination with the filler imparts to the system the property of decreased viscosity with increased shear rate at the temperature of coagulation i.e., when the viscosity of the system is measured using a Brookfield LVT or RVT viscometer the apparent viscosity falls with increasing rate of rotation of the spindle in the liquid system. However the upper limit of the non solvent addition is preferably just below the amount which causes the liquid system to separate away from the rotating spindle of the Brookfield viscometer at the temperature at which the layer is formed for example the temperature at which it is spread or extruded onto the support, i.e., the temperature in an extrusion die. A narrower range is one where both measurements are done at the coagulation temperature.

It will be appreciated that the actual amounts used will vary with the particular components in the system, but it will be observed that with the system described for FIG. 15 as little as about 2% of total water content (1% added water) starts to render the material thixotropic.

Clearly other non-solvents than water can be used and for any particular system a few simple tests such as shown in FIGS. 14 and 15 will enable one to determine the most desirable range or value of non-solvent content for that particular system.

As can be seen from FIG. 14 the paste having a 1.6:1 salt ratio, 32.7% resin solids and absorbed water 1 to 1.5% (based on DMF and water), curve 241, exhibits a very slight increase in viscosity when the spindle speed is reduced from 5 r.p.m. to 2.5 r.p.m. at 20° C. At 52° C, curve 242, the viscosity only increases from about 2.2 to 2.4 i.e., an increase of about 9%.

When the system contains 1.4:1 salt and 12% added water, curve 244, the viscosity at 52° C increases from about 5.1 at 5 r.p.m. to about 13.2 at 1 r.p.m. an increase of about 160%.

When the system contains 1.2:1 salt and 8% added water, curve 245, the viscosity at 51° C increases from about 5.2 at 5 r.p.m. to about 13.5 at 1 r.p.m. an increase of about 170%.

When the system contains 1.2:1 salt and 12% added water, curve 246, the viscosity at 52° C increases from about 5.0 at 5 r.p.m. to about 12 at 1 r.p.m. an increase of about 140%.

When the system contains 1.2:1 salt and 10% added water, curve 247, the viscosity at 54° C increases from about 4.5 at 5 r.p.m. to about 11.8 at 1 r.p.m. an increase of about 160%. For curve 243 the increase in viscosity on going from 5 r.p.m. to 2.5 r.p.m. is 48%; for curve 244, 71%; curve 245, 46%; curve 246, 46%; curve 247, 49%; for curve 242 the viscosity decreases slightly.

As can be seen from FIG. 15 the paste having a 1.2:1 salt ratio and 32% resin solids and 1.01% absorbed water (based on DMF and water) exhibits similar viscosity changes. Thus when 1.5% water is added (based on water and DMF) the viscosity at 27° C increases by 26% when the spindle speed is reduced from 5 to 1 r.p.m.; at 2.0% added water the increase is 51%; at 2.5% added water the increase is 73%; at 3.0% added water the increase is 84% and at 4.0% added water the increase is 94%. Similarly at 27° C when the spindle speed is reduced from 5 to 2.5 r.p.m. at 1.5% added water the increase in viscosity is 13%; at 2.0% added water, 18%; at 2.5% added water, 24.5%; at 3.0% added water, 26.5%; and at 4.0% added water, 27.5%.

We prefer to use a system such that when the viscosity of the system is measured using a Brookfield RVT viscometer at 27° C with a No. 7 spindle an increase of at least 20% and preferably at least 25% e.g., in the range 25% to 100% or 45% to 75% is observed in the viscosity on decreasing the spindle speed from 5 r.p.m. to 2.5 r.p.m.

When the spindle speed is reduced from 5 r.p.m. to 1 r.p.m. we prefer the viscosity increase to be at least 30% and preferably at least 40% or 50% e.g. in the range 50 to 200% e.g. 70% or 90% to 140% or 170%.

Referring again to the novel structure of the product of the present invention an area of 136.5 microns by 136.5 microns i.e., 0.0186 square millimeters is shown in FIG. 11 and the more dense regions occupy some 50 to 60% of the area of the cut plane. Small pores visible at the 120 fold magnification of FIG. 11 i.e., at least about 2 microns across are present in these dense regions. There are about 140 to 150 of such pores, less than 10 microns across visible in FIG. 11.

In FIG. 12 which is at 600 fold magnification an area 68 microns by 68 microns i.e., 0.0047 square millimeters contains about 50 such very small pores, the increased numbers of pores observable being due to the increased magnification which enabled pores as small as about 0.5 microns to be observed.

In FIG. 18 which shows the same area as FIG. 11 about 10 such pores 2 to 5 microns across can be observed in the more dense regions; in FIG. 19 about 50 and in FIG. 20 about 80; FIG. 9 showed about 90 such very small pores.

The novel structure of the product is thus further characterized by the cut plane containing between 10 and 250 preferably 50 to 150 or 250 pores visible at 120 fold magnification, the said pores being less than 10 microns across and the numbers of pores being per area of 0.0186 square millimeters, or more broadly from 50 to 1250 e.g., 250 to 750 or 1250 such pores per 0.1 square millimeters.

In the actual dense regions themselves the numbers of such pores typically range from 1 or 2, 7 or 8 per 10 microns by 10 microns square with the most typical concentrations being 4, 5 and 6 such pores to this unit of area. However higher concentrations e.g., up to 15 occur in some localised regions. These small pores are thus typically spaced 1 to 3 microns from their nearest neighbours or up to 5 microns in some instances.

The structure is further characterized in a preferred form such as shown in FIGS. 19, 20 and 11 by the more dense regions containing no pores in excess of 10 microns across occupying at least 20% of the area of the cut surface namely 33% in FIG. 19 and 60% in FIG. 11. Thus a preferred range is 30% to 70% of the cut surface area being occupied by the more dense regions.

Table 3

| Ex. | Salt Ratio | Water Content | Thickness (mm) | Density (gm/cc) | Tear Propagation Strength (kg) | Viscosity (poise) |
| --- | --- | --- | --- | --- | --- | --- |
| 7 | 1.6:1 | 0.7% | 1.17 | 0.52 | 2.3 | 3280 |
| 13 | 1.4:1 | 1.6% | 1.26 | 0.50 | 2.2 | 8500 |
| 15 | 1.4:1 | 2.5% | 1.31 | 0.44 | 2.2 | 8800 |
| 17 | 1.4:1 | 3.5% | 1.45 | 0.47 | 2.4 | 9920 |
| 19 | 1.2:1 | 4.8% | 1.19 | 0.53 | 2.8 | 9600 |
| 8 | 1.2:1 | 5.9% | 1.06 | 0.55 | 2.8 | 8700 |
| 9 | 1.0:1 | 7.4% | 1.07 | 0.55 | 3.0 | — |

This viscosity was measured at 50° C using an RVT Brookfield viscometer using spindle No. 7 at 2.5 r.p.m.

The tear propagation strength is measured on a tensile strength testing machine having a constant rate of traverse. The measurement is made on a sample 70 mms long by 45 mms wide punched out from a sheet. A cut 20 mms long is made with a sharp blade perpendicular to one of the short edges at its centre point. The jaws of the machine are set 20 mms apart and one tongue of the sample is gripped in each of the jaws. The jaws are then separated at a constant rate of 10 cm per minute and the load recorded constantly until the specimen is torn in half the tear starting at the cut. The maximum load recorded is quoted as the tear propagation strength.

When the cut tear strength is corrected to 1.4 mms thickness as for Table 1 the values are Example 7, 2.8; Example 13, 2.4; Example 15, 2.4; Example 17, 2.3; Example 19, 3.3; Example 8, 3.6; and Example 9, 3.9.

The cut tear strengths when corrected to 1.4 mm thickness and expressed as a percentage of notch tear are as follows: Example 7, 41%; Example 13, 37%; Example 15, 36%; Example 17, 36%, Example 19, 52%; Example 8, 61%; and Example 9, 61%.

There is thus a marked improvement in physical strength at a water content above 3.5% and we thus prefer to use water contents of 4.0% or 4.5% and above e.g. up to 7.5%.

Preferred products in accordance with the invention are thus characterized by having a cut tear strength expressed as a percentage of the notch tear strength which is in excess of 45% e.g. at least 50% e.g., in the range 50% to 65%.

Referring again to FIGS. 10 and 11 it can be seen that the dense regions occupy 50–60% of the area of 0.0186 sq. millimeters and there are approximately twenty voids more than 10 microns across but generally less than 50 microns e.g., 20 to 30 or 40 microns across.

It is thus preferred that there should be from 500 to 1500 e.g., 800 to 1300 or about 1000 voids greater than 10 microns across per square millimeter. Also it is preferred that in the dense regions there should be from 2000 to 15000 e.g. 6000 to 10000 or about 8000 pores per square millimeter visible at 120 fold magnification to an eye with 20/20 vision and less than 10 microns across e.g., 1 to 5 microns across.

A preferred combination is when there are about 700 to 900 voids above 10 microns across and 7000 to 9000 pores less than 10 microns across visible at 120 fold magnification per square millimeter.

What we claim as our invention and desire to secure by Letters Patent is:

1. A process for making a microporous sheet comprising:

preparing a mixture of a solution of polymer in a solvent for said polymer, dispersed microscopic removable filler particles and liquid non-solvent for said polymer, said non-solvent being miscible with said solvent and being present in amount insufficient to coagulate said solution or convert said solution to a colloidal gel, said polymer comprising elastomeric polyurethane, the proportion of polymer in said mixture being at least 20% based on solvent and polymer, the proportion of said removable filler being more than 10% of the weight of polymer, the proportion of non-solvent being above 1.6% w/w and sufficient to impart to said mixture a viscosity measured at 27° C with a Brookfield RVT viscometer (no. 7 spindle) which shows an increase in viscosity which is at least 30% higher at a spindle speed of 5 r.p.m. than at 1 r.p.m.

spreading said mixture as a layer;

coagulating said layer to microporous self supporting form by treatment of said layer with a non-solvent for the polymer miscible with the solvent and washing out said solvent and removing said non-solvent and said removeable filler particles.

2. Process as in claim 1 including the steps of forming on said layer (hereafter termed "substrate layer"), a topcoat layer prior to said coagulating, and, in said step c, coagulating the two layers simultaneously to an integral self-supporting microporous sheet by said treatment with non-solvent, said topcoat layer comprising thermoplastic elastomeric polymer and a solvent therefor which is miscible with said non-solvent.

3. A process as claimed in claim 2 in which the filler is a water soluble inorganic salt, and in that the majority of said filler particles prior to incorporation in the substrate formulation have maximum dimensions in the range 1 to 70 microns.

4. A process as claimed in claim 2 in which said mixture has a viscosity at 50° C measured on a Brookfield RVT viscometer using Spindle No. 7 at 2.5 r.p.m. in the range 8000 to 10000 poise.

5. A process as claimed in claim 2 in which said mixture has a viscosity at 27° C measured on a Brookfield RVT viscometer with a No. 7 Spindle which increases by at least 20% when the spindle speed is decreased from 5 r.p.m. to 2.5 r.p.m.

6. A process as claimed in claim 2 in which the amount of removable filler is from 1.0:1 to 1.4:1 by weight based on the polyurethane.

7. A process as claimed in claim 2 in which the substrate formulation comprises thermoplastic elastomeric polyurethane, dimethylformamide as solvent for the said polymer, the polymer content of the formulation being 20% to 40% by weight based on polymer and solvent, water as non-solvent for the said polymer miscible with the solvent and sodium chloride as the inorganic salt particles, the amount of non-solvent being from 1.6% up to 7.5% by weight based on polymer, solvent, non-solvent and inorganic salt, the amount of inorganic salt being from 1.0:1 to 1.4:1 by weight based on the polymer.

8. A process as in claim 2 and including the steps of removing said solvent, non-solvent and removable filler from the coagulated layers, the thickness of the substrate layer being such that after said removal said layer is at least 0.5 mm thick and is characterized by a reticulated matrix of polymer affording a plurality of compact voids intercommunicating by pores, said matrix having a total void volume in excess of 40% and at least 50% of the total void volume being provided by pores and the voids with which the said pores interconnect, the said pores having diameters in the range 6.4 to 25 microns as determined by mercury intrusion penetrometry, the said matrix being substantially free of voids visible to the unaided eye with 20/20 vision in normal daylight.

9. A product of the process of claim 8.

10. A product of claim 8 in which the cut tear strength of the product expressed as a percentage of the notch tear strength is in excess of 45%.

11. A process as claimed in claim 1 in which the polymer is initially in solution in a polar organic solvent and the microscopic filler and liquid non-solvent are added to the solution.

12. A process as claimed in claim 11 in which the removable filler particles are soluble in the non-solvent but are present in such proportions that solid undissolved particles are present in the layer.

13. A process as claimed in claim 12 in which the amount of polyurethane based on polyurethane and solvent lies in the range 30% to 35% by weight and the ratio of filler to polyurethane lies in the range 1.0:1 to 1.4:1 by weight and 6% to 12% by weight of non-solvent based on solvent and non-solvent is added to the polyurethane solution.

14. A process as claimed in claim 1 in which the ratio of filler to polymer is 1.0:1 to 1.4:1 and the amount of non-solvent is less than that which would cause coagulation of the polymer at the temperature at which said mixture is prepared.

15. A process as in claim 1 characterized in that the mixture comprises thermoplastic elastomeric polyurethane, dimethylformamide as solvent for the said polymer, the polymer content of the mixture being 20% to 40% by weight based on polymer and solvent, water as non-solvent for the said polymer miscible with the solvent and inorganic salt particles comprising sodium chloride as the removable filler, the amount of non-solvent in the mixture being from 1.6% up to 7.5% by weight based on polymer, solvent, inorganic salt and non-solvent, the amount of inorganic salt being from 1.0:1 to 1.4:1 by weight based on the polymer.

16. A process as claimed in claim 15 characterized in that the majority of the salt particles prior to incorporation in the polymer composition have maximum dimensions in the range 1 to 70 microns.

17. Process as in claim 16 in which the water content of said mixture is 4.5 to 7.5%.

18. A process for making a microporous sheet comprising
a. preparing a mixture of a solution of polymer in a solvent for said polymer, dispersed microscopic removable filler particles and liquid non-solvent for said polymer, said non-solvent being miscible with said solvent and being present in amount insufficient to coagulate said solution or convert said solution to a colloidal gel, said polymer comprising elastomeric polyurethane, the proportion of polymer in said mixture being at least 20% based on solvent and polymer, the proportion of said removable filler being more than 10% of the weight of polymer.
the proportion of non-solvent being above 1.6% w/w and sufficient to increase the viscosity and to impart to said mixture the property of decreased viscosity with increased shear rate;
b. spreading said mixture as a layer;
c. coagulating said layer to microporous self supporting form by treatment of said layer with a non-solvent for the polymer miscible with the solvent and washing out said solvent and removing said non-solvent and removable filler.

19. Process as in claim 18 in which the thickness of said spread layer is such that, after said coagulation and removal of said solvent, said non-solvent and said removable filler, the thickness of the resulting layer is 0.5 to 5.mm.

* * * * *

UNITED STATES PATENT AND TRADEMARK OFFICE
CERTIFICATE OF CORRECTION

PATENT NO. : 4,090,010

DATED : May 16, 1978

INVENTOR(S) : Eric Albert Warwicker, et al

It is certified that error appears in the above—identified patent and that said Letters Patent is hereby corrected as shown below:

Columns 3 and 4 should be deleted to insert the attached columns 3 and 4 therefor.

THIS CERTIFICATE APPLYS TO THE GRANT EXCLUSIVELY.

Signed and Sealed this

First Day of April 1980

[SEAL]

Attest:

SIDNEY A. DIAMOND

Attesting Officer

Commissioner of Patents and Trademarks

Preferably the layer of polymer extended with liquid vehicle contains at least 25% w or 30% w or more e.g., up to 35% or 40% polymer. The upper limit being determined by the need for the system to be capable of being formed into a continuous layer.

When the polymer is initially in solution in a polar organic solvent such as N,N dimethylformamide (DMF) concentrations in the range 30 to 35% w are very suitable.

Many polar organic solvents could be used but DMF is preferred.

The particular solvent which is used can vary depending on the particular polymer composition non solvent and removable filler which are being used. The solvent should not react with the other components of the system although it can form complexes with the non solvent e.g., hydrates when the non solvent is water as is believed to be the case with DMF. Also the solvent must be miscible with the non-solvent, preferably completely so, and must be able to be extracted from the coagulated polymer.

Solvents which could be used instead of DMF include amides, esters, alcohols, ketones, sulphones, and phenols, however preferred alternative solvents to DMF are dimethyl sulphoxide, N-methyl pyrrolidone, and dimethyl acetamide and blends thereof with cheaper solvents such as toluene and methyl ethyl ketone which although not solvents for the polyurethane on their own do not act as non-solvents when mixed with dimethylformamide.

The non-solvent to be used will also vary depending on the particular polymer composition, solvent and removable filler which are being used. Again the non-solvent should be chemically inert to the polymer and removable filler thought it may be a solvent for the removable filler and may form complexes with the solvent. The non-solvent should be miscible with the solvent and should be a non-solvent for the polymer, i.e., when added in excess to a solution of the polymer it should coagulate the polymer.

Suitable inert non-solvent liquids include methanol, ethanol, water, hydrocarbons such as hexane, octane, benzene, petroleum naphtha, toluene, chlorinated hydrocarbons, such as tetrachloroethylene and chloroform, polyols such as ethylene glycol, glycerol, and 1,1,1,-trimethylolpropane and glycol monoethyl ether and mixtures thereof. However the preferred non-solvent is water since it presents no recovery problems and is far cheaper than any of the alternatives and moreover since it is a very good solvent for the preferred removable fillers, namely inorganic salts such as sodium chloride, it can also be used as the non-solvent for the actual coagulation step of the process. Different non-solvents could be used in the thixotropic mixture and for the coagulation but it is preferred to use the same non-solvent for both functions.

The removable filler is preferably a water soluble solid or a solid which can be dissolved by a non-solvent compatible with the polymer. The removable filler could be one, e.g., a carbonate or bicarbonate, which can be removed by chemical action of the coagulating non-solvent e.g., a dilute aqueous acid or by thermal decomposition e.g., ammonium carbonate or bicarbonate but it should be chemically inert during the actual coagulation stage to ensure that no gas bubbles are produced in the coagulated microporous structure. Whilst such alternatives are possible they add complications to the process and are not preferred.

The preferred removable fillers are water soluble inorganic salts e.g., the alkali metal and alkaline earth metal and ammonium salts e.g., chlorides and sulphates or nitrates, especially sodium and potassium chlorides and sulphates and ammonium sulphate, sodium chloride being preferred on grounds of cheapness, relative solubilities, and ease of availability.

Preferably the removable filler particles are of a material which is soluble in the non-solvent present in the mixture but are present in such proportions that solid undissolved particles are present in the layer since this ensures that the polymer composition is thixotropic.

The ratio of filler to polymer is preferably 1.0:1 to 1.4:1 especially 1.1:1 to 1.3:1. The amount of non-solvent is less than that which would convert the polymer solution to a colloidal gel or cause coagulation of the polymer at the temperature at which the system is formed, it may however be such as to enable a degree of coagulation or gelling to occur when the temperature of the system is reduced, e.g., from an elevated temperature such as 50° C or 60° C or more to lower temperatures e.g. 30° C or 20° C or below. However the system does not rely on cooling to achieve the required results, and it is preferred to coagulate at above the temperature at which coagulation would start merely on cooling thus benefiting from the more rapid coagulation observed at higher temperatures whilst still obtaining a product with an adequately smooth surface. This is thought to result from the relatively high viscosity of the systems containing non-solvent and filler especially sodium chloride and water with dimethylformamide, at temperatures such as 50° C.

In one form of the process the polymer system is formed at elevated temperature and then coagulated at elevated temperature. This results in very rapid coagulation producing a strong even microporous structure.

In another form of the process the polymer system is again formed at elevated temperature but is coagulated at a lower temperature. This results in slightly less rapid coagulation though again a strong even microporous structure is produced.

The removable filler may be present in excess of 10% w/w of the polyurethane and desirably at least 50% or 100% w/w. One useful system, showing decreased viscosity with increased shear rate is that in which the amount of polyurethane based on polyurethane and solvent lies in the range 30% to 35% w/w and the ratio of filler to polyurethane lies in the range 1.0:1 to 1.4:1 w/w and 6% to 12% w/w of non-solvent based on solvent and non-solvent is added to the polyurethane solution. A preferred system is one in which the solvent is DMF the filler microscopic sodium chloride and the non-solvent is water.

The system contains from above 1.6% e.g. at least 2.0% and preferably at least 3.5% up to 7.5% w/w of non-solvent based on polymer, solvent, filler and non-solvent; these figures apply particularly to the preferred polyurethane, sodium chloride, DMF, water system but similar ranges will apply for other solvents non-solvents and fillers though with non-solvents other than water higher values will probably be needed.

With the teaching given below simple trial and experiment will indicate the effective proportions to achieve the desired showing decreased viscosity with increased shear rate. A majority of the filler particles preferably have maximum dimensions in the range 1 to 70 microns prior to addition to the mixture; further details of preferred particle size range are given below.